United States Patent [19]

Miyazawa et al.

[11] Patent Number: 5,202,954
[45] Date of Patent: Apr. 13, 1993

[54] DIGITAL FUZZY APPARATUS HAVING SIMPLIFIED BARYCENTRAL OPERATION ARRANGEMENT

[75] Inventors: Azuma Miyazawa, Mitaka; Kozi Mizobuchi; Takashi Suzuki, both of Hachioji, all of Japan

[73] Assignee: Olympus Optical Co., Ltd., Tokyo, Japan

[21] Appl. No.: 790,125

[22] Filed: Nov. 4, 1991

Related U.S. Application Data

[63] Continuation-in-part of Ser. No. 547,912, Jul. 3, 1990, abandoned.

[30] Foreign Application Priority Data

Jul. 14, 1989 [JP] Japan ................................. 1-181743

[51] Int. Cl.$^5$ ............................................. G05B 11/00
[52] U.S. Cl. .......................................... 395/3; 395/51; 395/900
[58] Field of Search ........................................ 395/3, 51

[56] References Cited

U.S. PATENT DOCUMENTS

| | | | |
|---|---|---|---|
| 4,716,540 | 12/1987 | Yamakawa | 364/807 |
| 4,852,007 | 7/1989 | Yasunobu et al. | 364/426.01 |
| 4,875,184 | 10/1989 | Yamakawa | 364/807 |

OTHER PUBLICATIONS

Togai and Watanabe, "Expert System on a Chip: An Engine for Real-Time Approximate Reasoning", IEEE Expert, Fall 1986, 55-62.
Sultan, L., "A Formal Approach for the Organization and Implementation of Fuzzy Micro-Processor Module", Fuzzy Computing, 1988, 201-221.
Waller, L., "Fuzzy Logic Microprocessor Tackles Real-Time Tasks", Electronic Design, Feb. 9, 1989, p. 25.
Lim et al., "Implementing Fuzzy Rule-Based Systems on Silicon Chips", IEEE Expert, Feb. 1990, pp. 31-45.
Watanabe et al., "A VLSI Fuzzy Logic Controller with Reconfigurable, Cascadable Architecture", IEEE Jour. Solid-State Circuits, vol. 25 (2), Apr. 1990, pp. 376-382.

*Primary Examiner*—Michael R. Fleming
*Assistant Examiner*—Robert W. Downs
*Attorney, Agent, or Firm*—Frishauf, Holtz, Goodman & Woodward

[57] ABSTRACT

A digital fuzzy apparatus includes a fuzzy rule operation circuit for performing an operation on an input value in accordance with fuzzy rules constituted by membership functions and outputting address position data and fitness degree data in units of fuzzy rules. A maximum value operation circuit calculates a maximum value of fitness degree data output from the fuzzy rule operation circuit at each corresponding address position. An address selector selects an effective range on the basis of an address position at which the maximum value of the fitness degree data which are output at each corresponding address position exceeds a predetermined value. A barycentral position operation circuit calculates a barycentral position on the basis of the address positions within the effective range and the fitness degree data output from the maximum value operation circuit in correspondence with the address positions. An output circuit calculates a final barycentral position in accordance with the barycentral position output from the barycentral position operation circuit and the address positions selected by the address selector and outputs the final barycentral position as an inferential result.

21 Claims, 32 Drawing Sheets

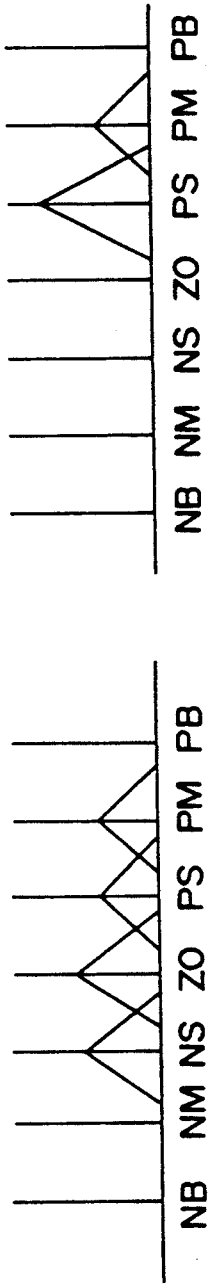
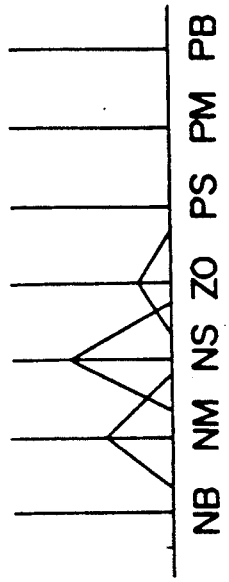
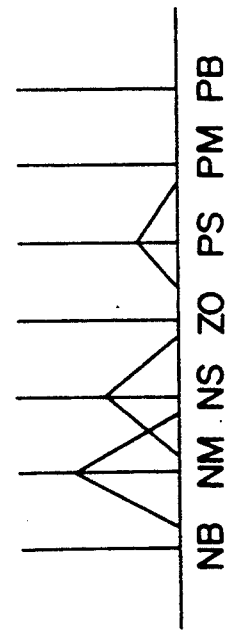

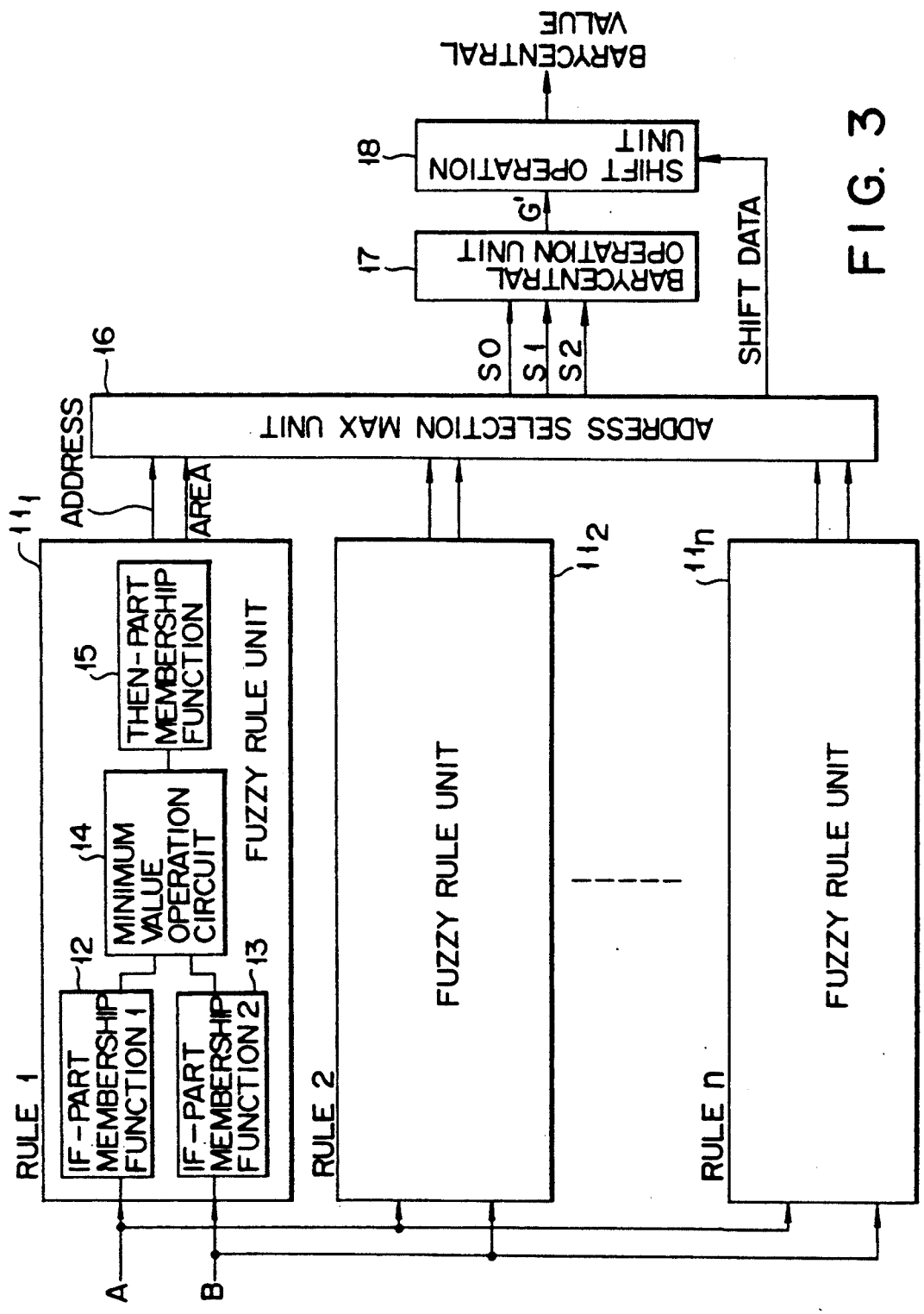

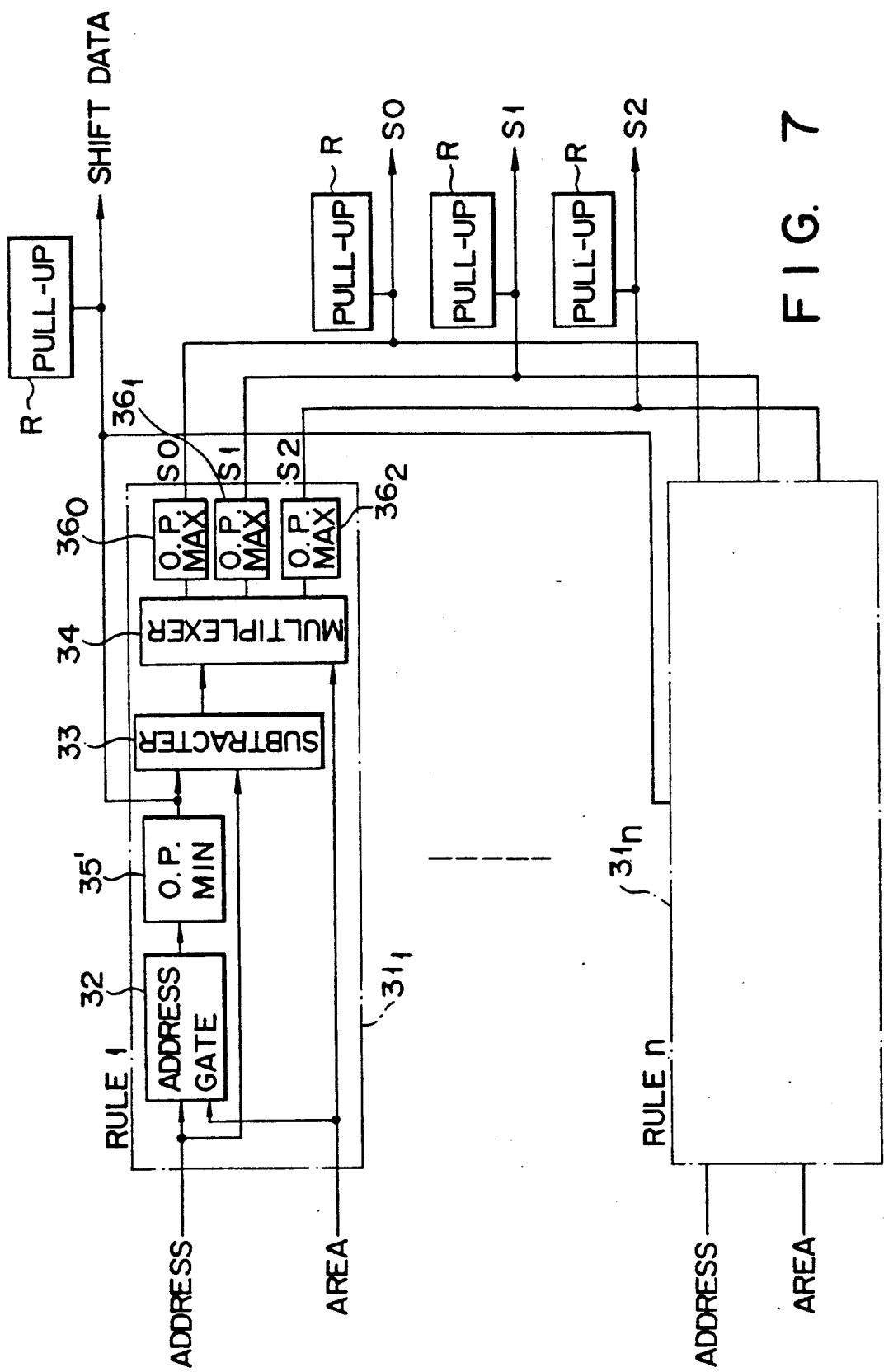
F I G. 7

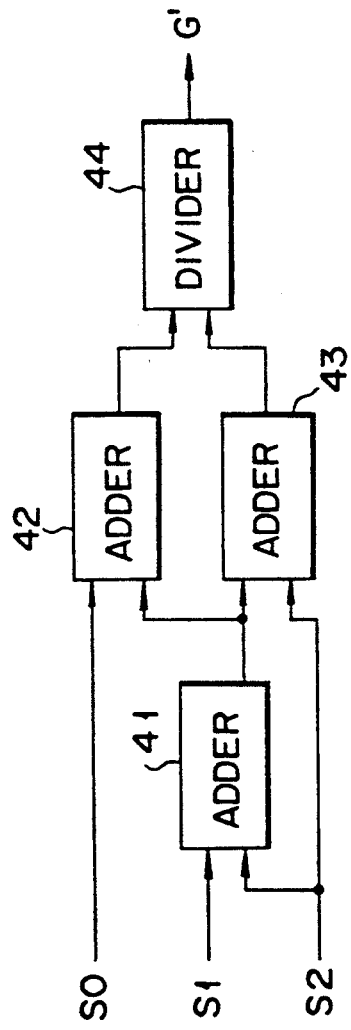
F I G. 8
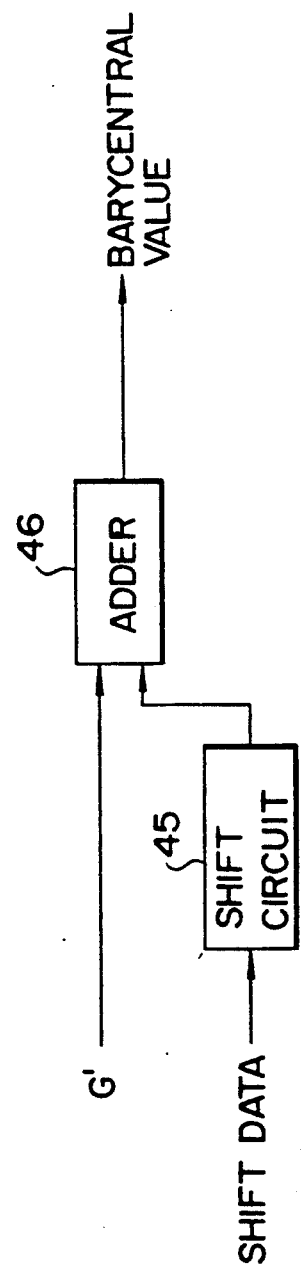
F I G. 9

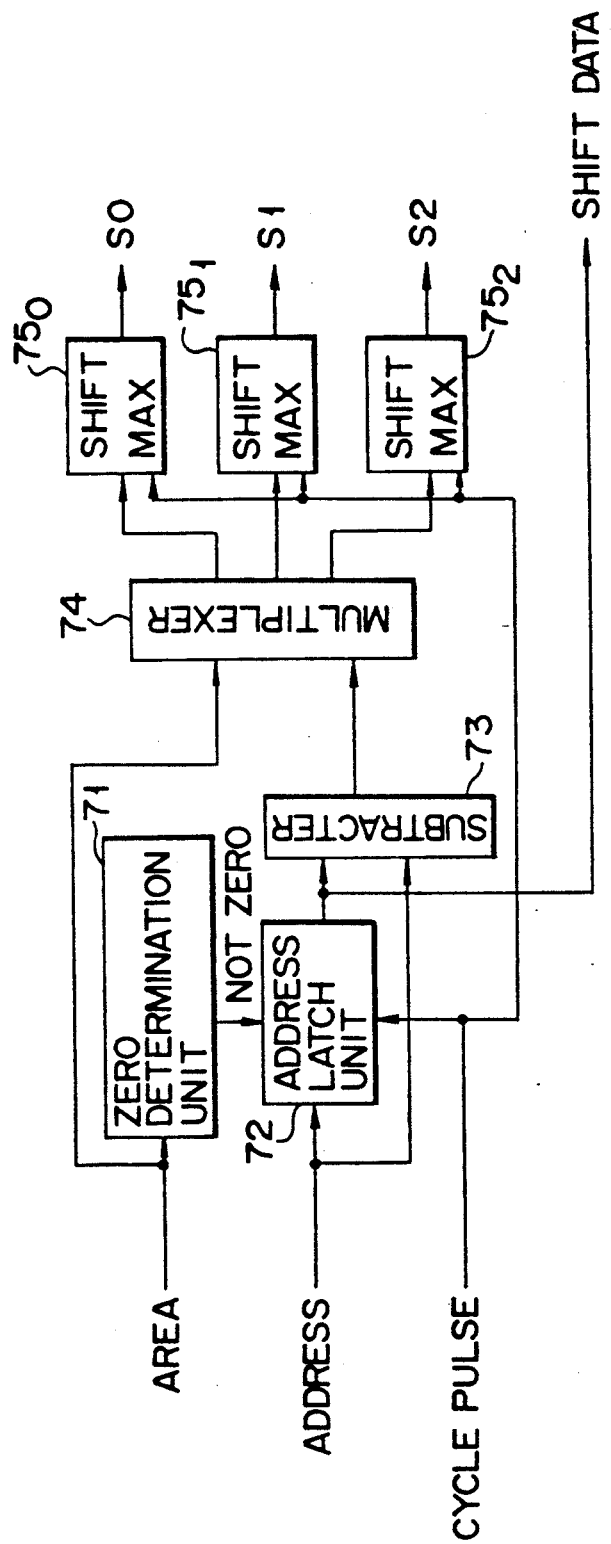
F I G. 11

| INPUT | | | | | | OUTPUT (O5 - O0) | | | | | |
|---|---|---|---|---|---|---|---|---|---|---|---|
| A5>B5 | x | x | x | x | x | A5 | A4 | A3 | A2 | A1 | A0 |
| A5=B5 | A4>B4 | x | x | x | x | A5 | A4 | A3 | A2 | A1 | A0 |
| A5=B5 | A4=B4 | A3>B3 | x | x | x | A5 | A4 | A3 | A2 | A1 | A0 |
| A5=B5 | A4=B4 | A3=B3 | A2>B2 | x | x | A5 | A4 | A3 | A2 | A1 | A0 |
| A5=B5 | A4=B4 | A3=B3 | A2=B2 | A1>B1 | x | A5 | A4 | A3 | A2 | A1 | A0 |
| A5=B5 | A4=B4 | A3=B3 | A2=B2 | A1=B1 | A0>B0 | A5 | A4 | A3 | A2 | A1 | A0 |
| A5=B5 | A4=B4 | A3=B3 | A2=B2 | A1=B1 | A0=B0 | A5 | A4 | A3 | A2 | A1 | A0 |
| A5<B5 | x | x | x | x | x | B5 | B4 | B3 | B2 | B1 | B0 |
| A5=B5 | A4<B4 | x | x | x | x | B5 | B4 | B3 | B2 | B1 | B0 |
| A5=B5 | A4=B4 | A3<B3 | x | x | x | B5 | B4 | B3 | B2 | B1 | B0 |
| A5=B5 | A4=B4 | A3=B3 | A2<B2 | x | x | B5 | B4 | B3 | B2 | B1 | B0 |
| A5=B5 | A4=B4 | A3=B3 | A2=B2 | A1<B1 | x | B5 | B4 | B3 | B2 | B1 | B0 |
| A5=B5 | A4=B4 | A3=B3 | A2=B2 | A1=B1 | A0<B0 | B5 | B4 | B3 | B2 | B1 | B0 | x --- DON'T CARE

FIG. 15B

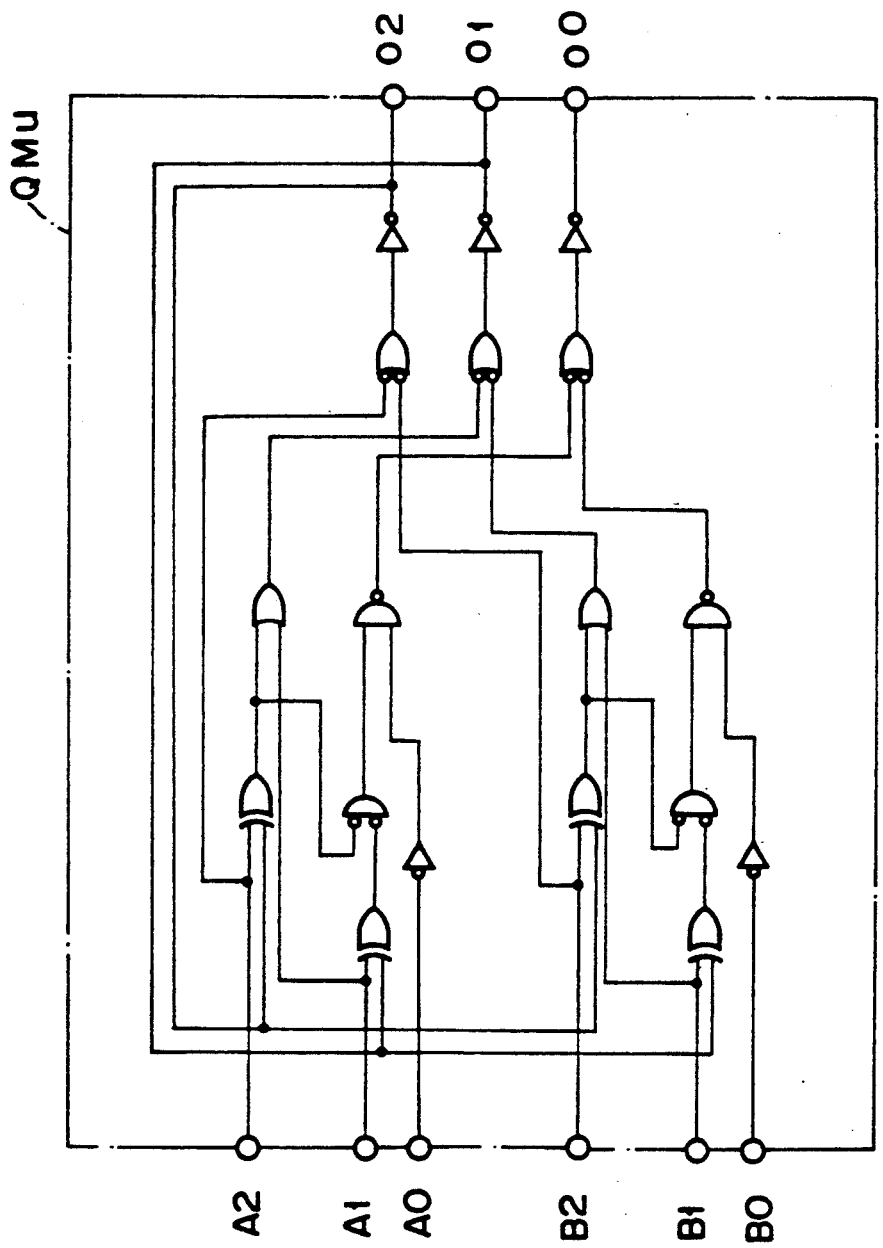
F I G. 17A

| INPUT | | | OUTPUT (02~00) | | |
|---|---|---|---|---|---|
| A2>B2 | × | × | A2 | A1 | A0 |
| A2=B2 | A1>B1 | × | A2 | A1 | A0 |
| A2=B2 | A1=B1 | A0>B0 | A2 | A1 | A0 |
| A2<B2 | × | × | B2 | B1 | B0 |
| A2=B2 | A1<B1 | × | B2 | B1 | B0 |
| A2=B2 | A1=B1 | A0<B0 | B2 | B1 | B0 |

×---DON'T CARE

FIG. 17B

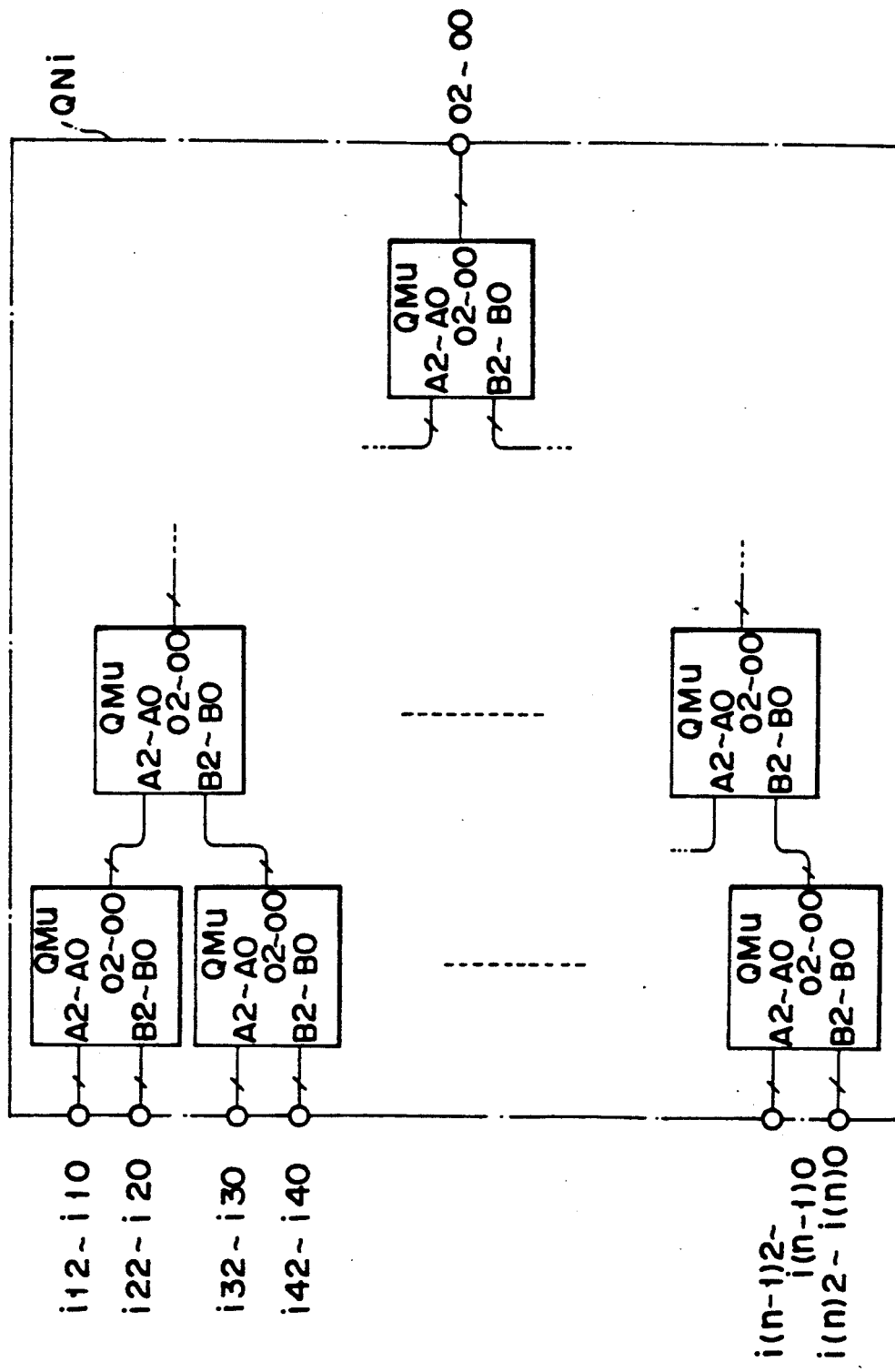
F I G. 21

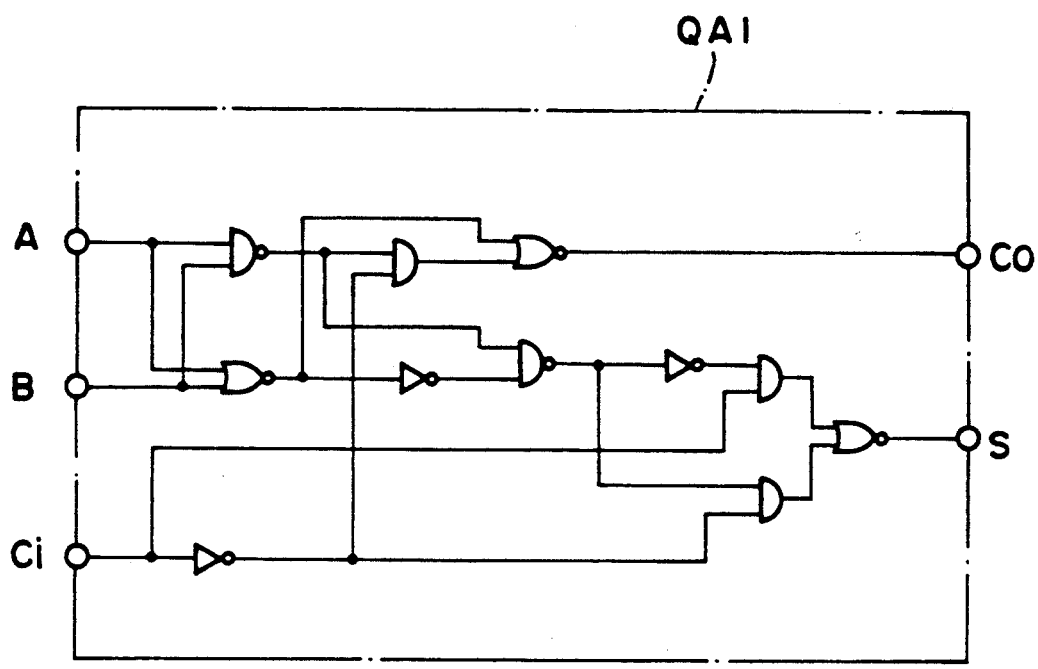
F I G. 22A

| INPUT | | | OUTPUT | |
|---|---|---|---|---|
| A | B | Ci | S | Co |
| L | L | L | L | L |
| H | L | L | H | L |
| L | H | L | H | L |
| L | L | H | H | L |
| H | H | L | L | H |
| H | L | H | L | H |
| L | H | H | L | H |
| H | H | H | H | H |

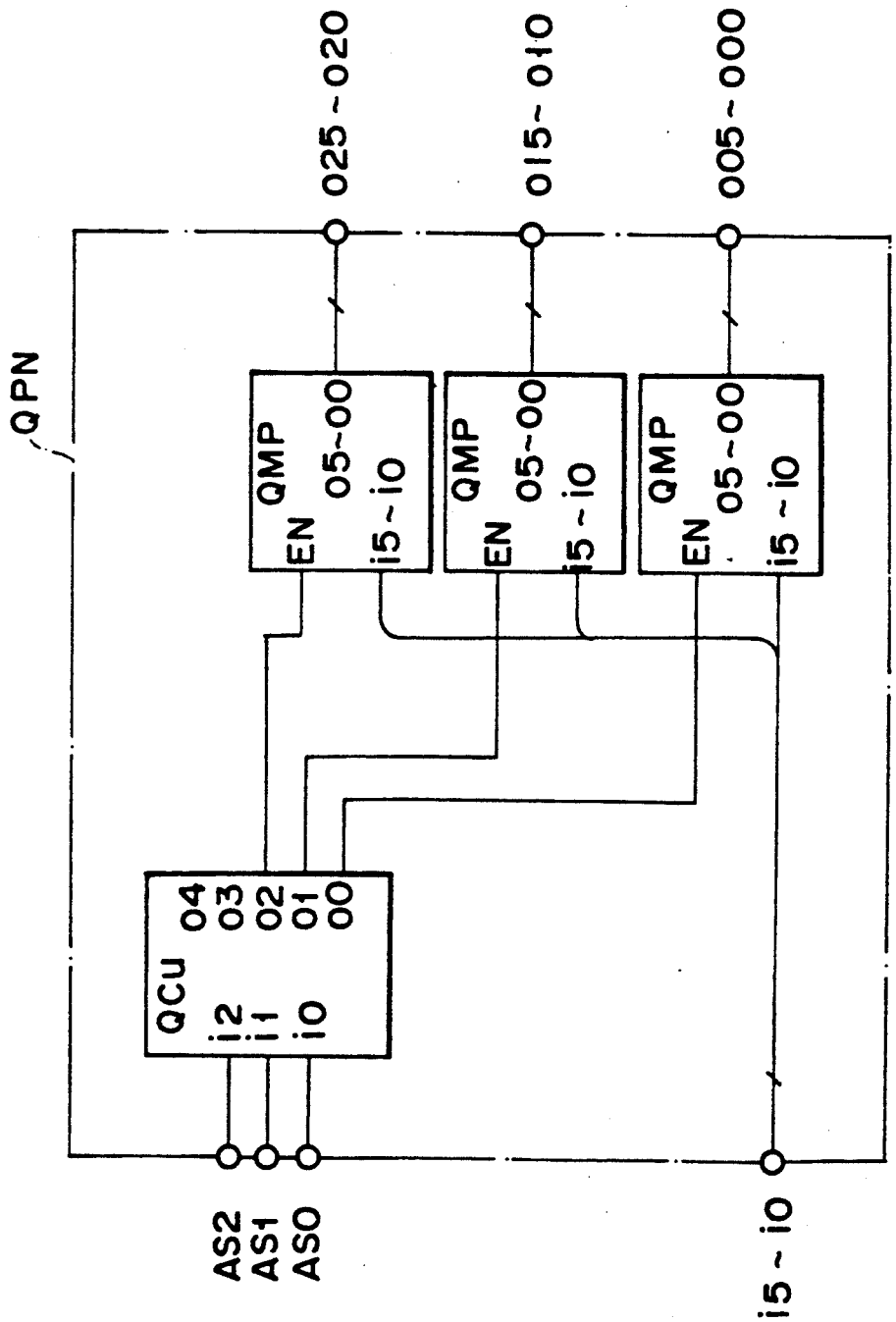
F I G. 24

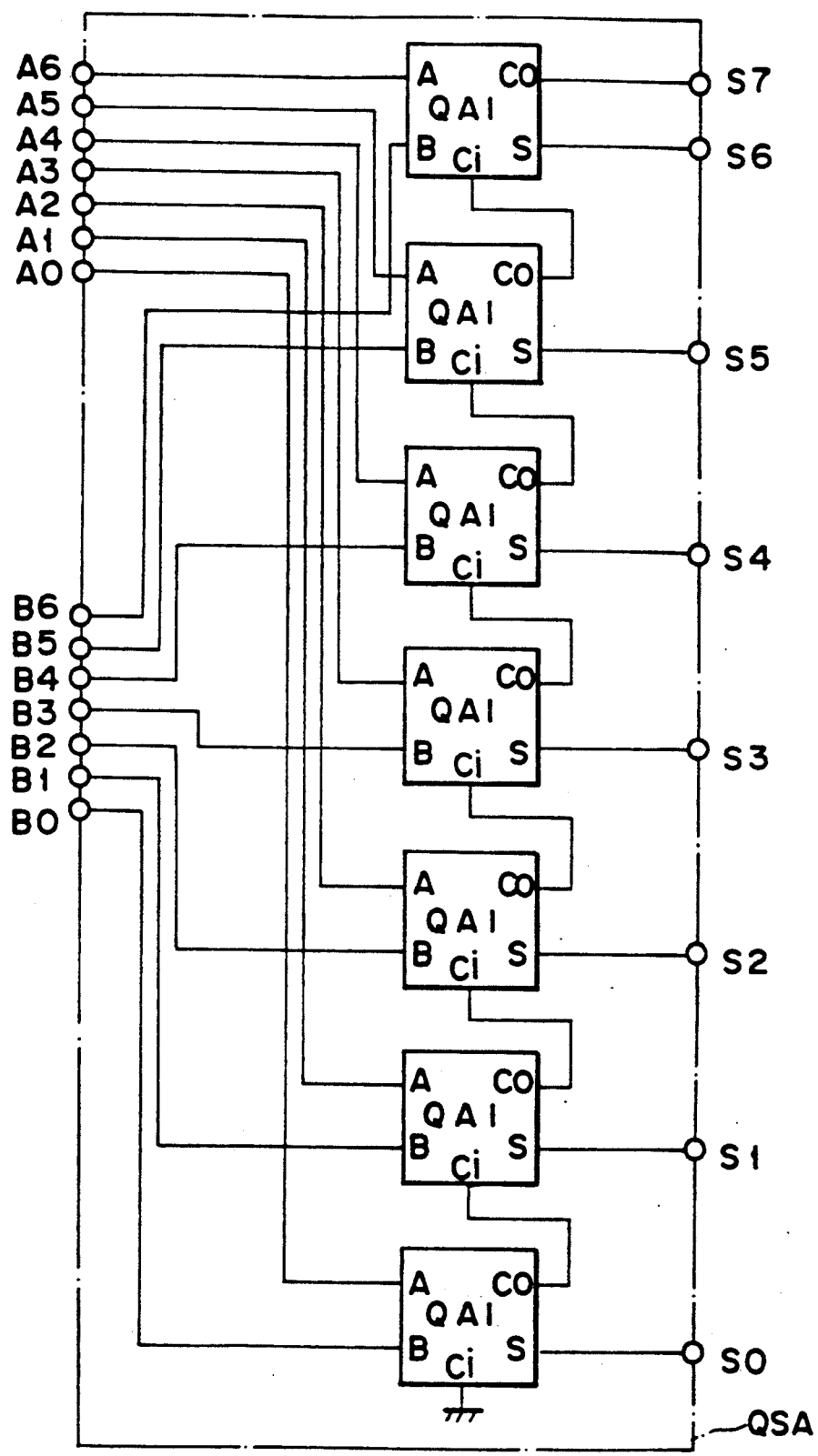
F I G. 26

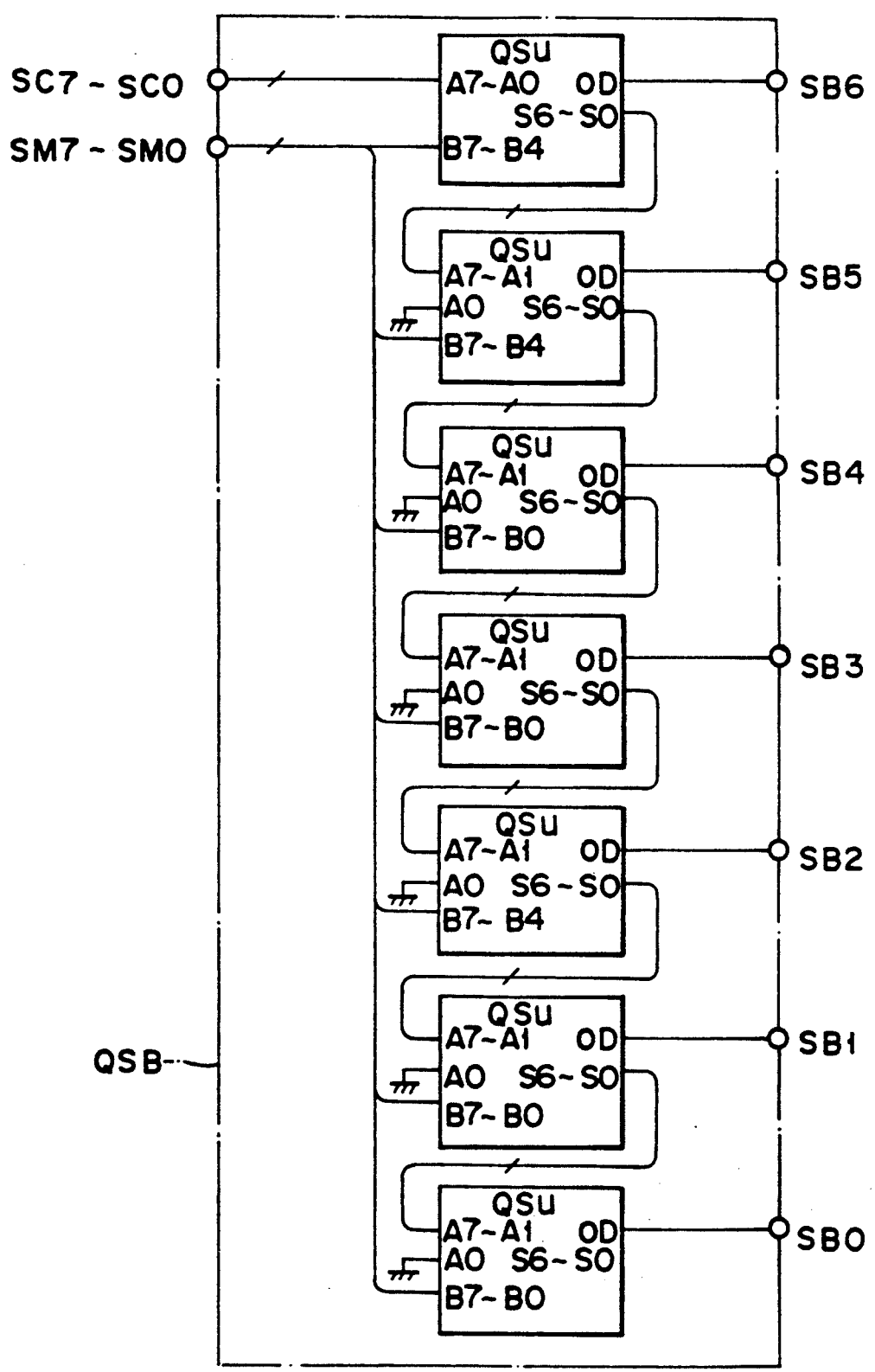
F I G. 28

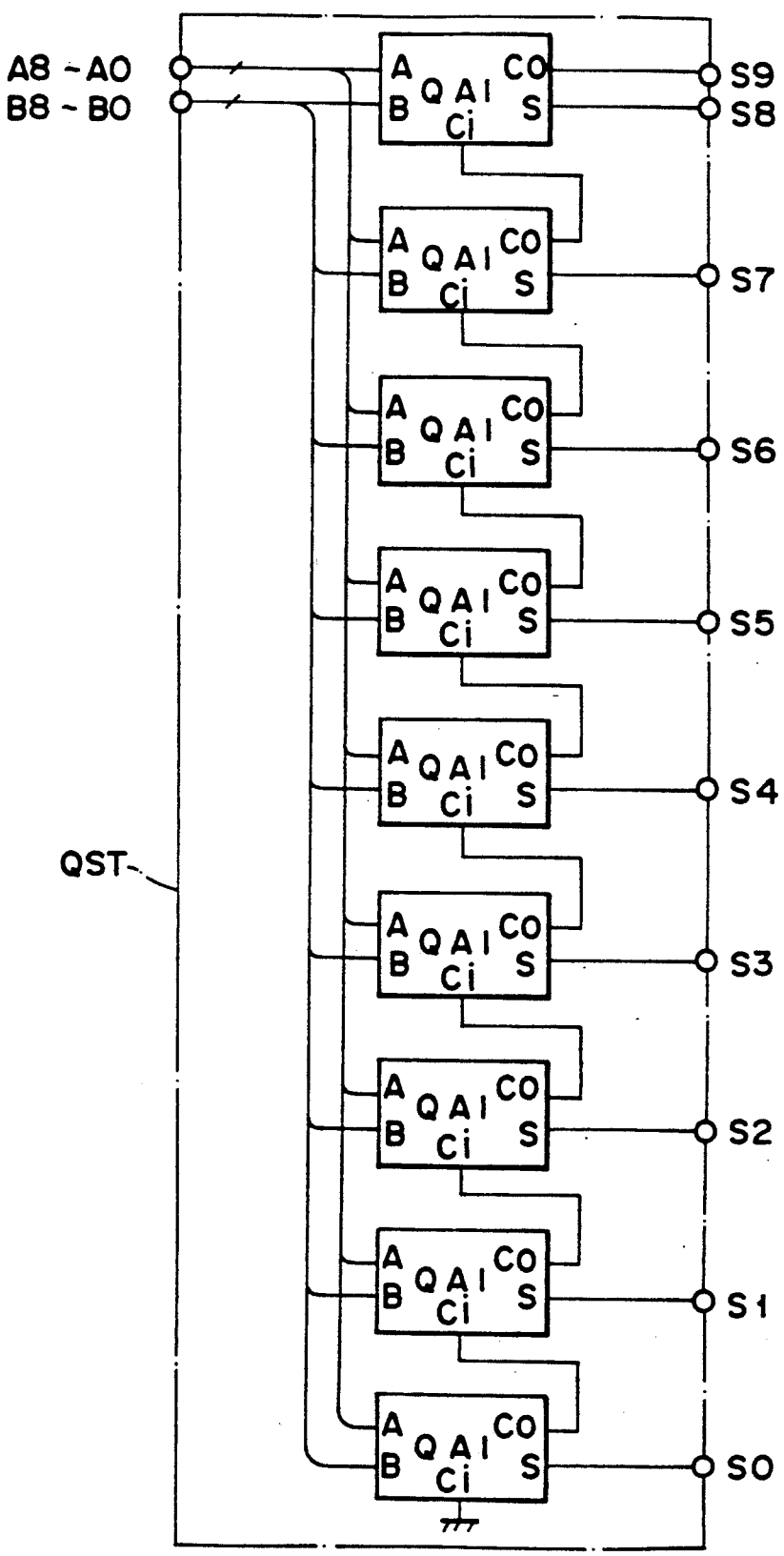
F I G. 29

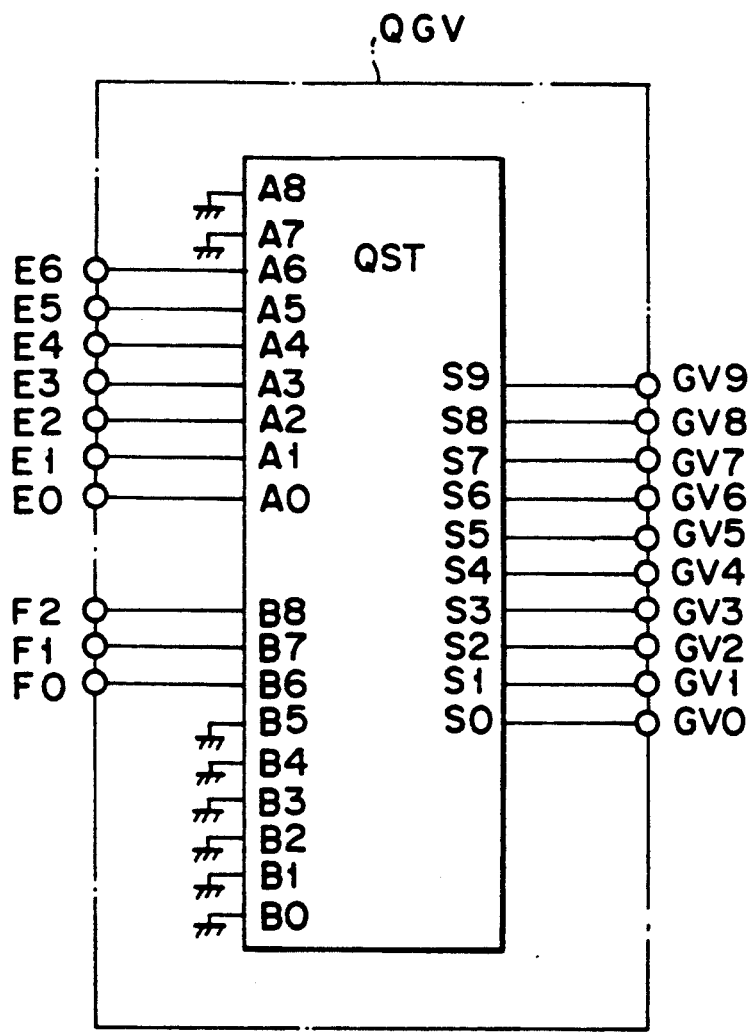
F I G. 30

DIGITAL FUZZY APPARATUS HAVING SIMPLIFIED BARYCENTRAL OPERATION ARRANGEMENT

This application is a continuation-in-part of application Ser. No. 07/547,912, filed Jul. 3, 1990, now abandoned.

BACKGROUND OF THE INVENTION

1. Field of the Invention

The present invention relates to a digital fuzzy apparatus for performing fuzzy inference and, more particularly, to a digital fuzzy apparatus in which the circuit sizes of a maximum value operation unit and a center of gravity determining unit are reduced.

2. Description of the Related Art

The fuzzy theory was proposed by Prof. L. A. Zadeh, University of California, in 1965, as is well known, and a possibility of practical applications of the fuzzy theory was proposed by Prof. E. H. Mamdani, London University, in 1974. Various fuzzy inferential means have been proposed since then. Typical examples are as follows.

U.S. Pat. No. 4,852,007 (corresponding to Published Unexamined Japanese Patent Application No. 58-192407) describes a rolling stock operation control technique for reducing a notch variation count in accordance with a software inference. U.S. Pat. No. 4,716,540 (corresponding to Published Japanese Patent Application No. 61-20428) describes an analog fuzzy circuit realized by a current circuit.

Nikkei Electronics, No. 457, Oct. 3, 1988 describes a system employing a memory scheme practiced in Hohsei University or the University of North Carolina, and a fuzzy controller processor for writing inference data in an instruction memory, as proposed by Togai Infralogic Corp.

The conventional techniques described above, however, have the following drawbacks. More specifically, a fuzzy inferential system utilizing software can be realized by the state-of-art personal computers and microcomputers, but their inferential speeds are very low. In an analog fuzzy inferential system utilizing a current circuit, an interface is required when the system is used as an accessory to a digital computer. A fuzzy inferential system utilizing a memory scheme or a special-purpose processor requires large-scale development tools. In addition, since a memory is used, a system clock is also required. A high-speed clock is required to perform a high-speed inference. For this reason, such a system becomes a noise source when it is used near an analog circuit or the like.

In order to cope with the above situation, the present applicant proposes a high-speed, versatile digital fuzzy circuit in Japanese Patent Application No. 63-278797.

When the digital fuzzy circuit is to be formed into an IC (Integrated Circuit), it is important to determine how to simply design the circuit. In this respect, the digital fuzzy circuit disclosed in Japanese Patent Application No. 63-278797 has a complicated circuit arrangement and has much room left for a simpler circuit.

SUMMARY OF THE INVENTION

It is, therefore, an object of the present invention to provide a digital fuzzy circuit having a very simple center of gravity determining unit and, particularly, a digital fuzzy circuit suitable for an IC.

In order to achieve the above object of the present invention, there is provided a digital fuzzy apparatus comprising:

fuzzy rule operating means for performing an operation on an input value in accordance with fuzzy rules constituted by membership functions and outputting address position data and fitness degree data in units of rules;

maximum value operating means for operating a maximum value of the fitness degree data output from the fuzzy rule operating means at each address position corresponding to the fitness degree data;

address selecting means for selecting an effective range on the basis of an address position at which the maximum value of the fitness degree data output in units of address positions exceeds a predetermined value;

center of gravity position operating means for calculating a center gravity position in accordance with the address positions of the effective range and the fitness degree data output from the maximum value operating means in correspondence with the address positions of the effective range; and output means for obtaining a final barycentral position and outputting the final center of gravity position as an inference result in accordance with the center of gravity position output from the center of gravity position operating means and the address positions selected by the address selecting means.

BRIEF DESCRIPTION OF THE DRAWINGS

The aspects and other features of the present invention will be described with reference to the following detailed description in conjunction with the accompanying drawings, in which:

FIGS. 2A to 2D are views showing outputs of inference results obtained when good and bad rules are used;

FIG. 3 is a block diagram showing a detailed circuit arrangement of the digital fuzzy apparatus;

FIG. 7 is a block diagram showing the third embodiment of an address selection MAX unit;

FIG. 8 is a block diagram showing a circuit arrangement of a barycentral operation unit;

FIG. 9 is a block diagram showing a circuit arrangement of shift operation unit;

FIG. 11 is a block diagram showing an arrangement an address selection MAX unit in FIG. 10;

FIG. 15B is a truth table for operation of macrocell QCR shown in FIG. 15A;

FIG. 17A is a circuit diagram for macrocell QMu shown in FIG. 18;

FIG. 17B is a truth table for operation of macrocell QMu shown in FIG. 17A;

FIG. 21 is a block diagram for MIN 35 shown in FIG. 6;

FIG. 22A is a circuit diagram for macrocell QAI shown in FIG. 23;

FIG. 24 is a block diagram of multiplexer 34 shown in FIG. 6;

FIG. 26 is a block diagram of addition circuits 41–43 shown in FIG. 8;

FIG. 28 is a block diagram of subtraction circuit 44 shown in FIG. 8;

FIG. 29 is a block diagram of macrocell QST shown in FIG. 30;

FIG. 30 is a schematic circuit diagram of addition circuits 46 shown in FIG. 9;

DETAILED DESCRIPTION OF THE PREFERRED EMBODIMENTS

An embodiment of the present invention will be described with reference to the accompanying drawings.

Figure 1:
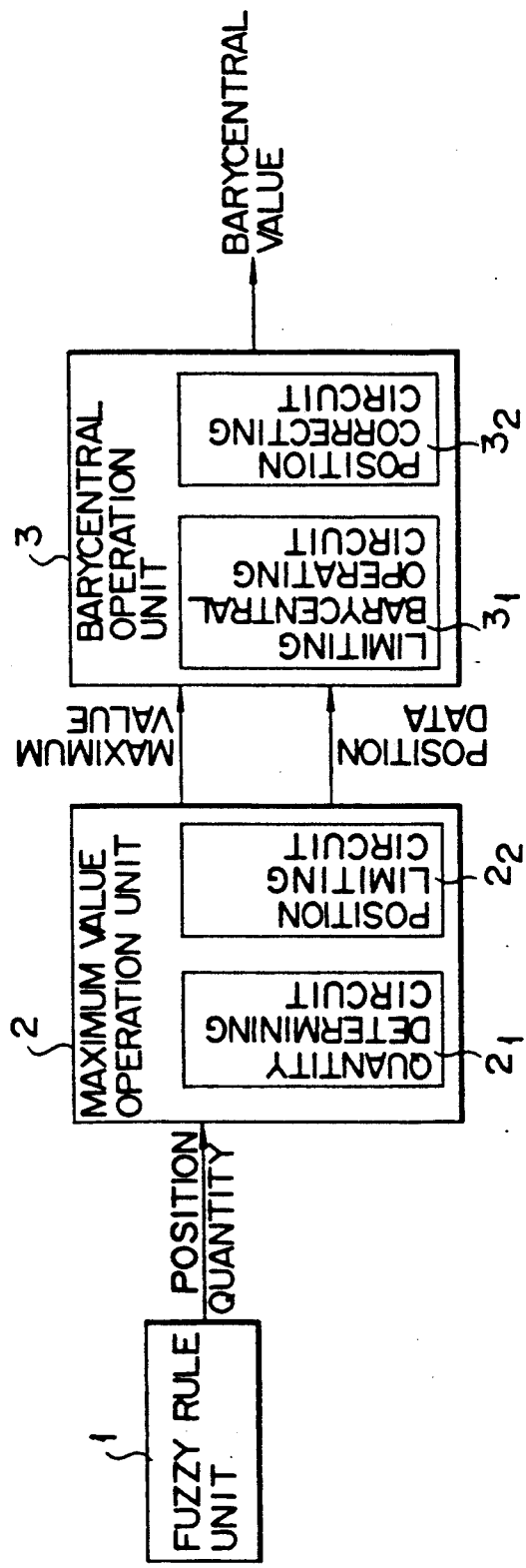
FIG. 1 is a block diagram showing a basic arrangement of a digital fuzzy apparatus.

FIG. 1 is a block diagram showing a basic arrangement of a digital fuzzy apparatus according to the present invention. Referring to FIG. 1, a fuzzy rule unit 1 performs an operation on an input value in accordance with fuzzy rules constituted by membership functions. Each inferential result of the fuzzy rule is input to a maximum value operation unit 2 as quantity data and position data. The maximum value operation unit 2 includes a quantity determining circuit $2_1$ and a position limiting circuit $2_2$. The quantity determining circuit $2_1$ determines a fuzzy quantity at each position, i.e., the presence/absence of a fuzzy quantity. The position limiting circuit $2_2$ eliminates a portion having no fuzzy quantity, i.e., a portion corresponding to no output from the rule unit and limits to only effective positions. According to the present invention, the maximum value operation is performed for only effective positions, and its operation result and the limited position data are input to a center of gravity operation unit 3. The center of gravity operation unit 3 has a limiting center of gravity operating circuit $3_1$ and a position correcting circuit $3_2$. The limiting center of gravity operating circuit $3_1$ performs center of gravity operations at the limited positions on the basis of the maximum value operation result. The position correcting circuit $3_2$ corrects the center of gravity position in accordance with the barycentral operation result and the limited position data.

Only good fuzzy rules free from contradiction are used to converge inference outputs to a few positions in each cycle of inference, thereby further simplifying the center of gravity operation unit 3.

FIGS. 2A and 2B show output results of inference when rules are not properly set, and FIGS. 2C and 2D show output results of inference when rules are properly set. Referring to FIGS. 2A to 2D, each label, NB, NM, NS, ZO, PS, PM, and PB are addresses (positions) of the then-part membership functions. More specifically, NB (Negative Big) represents "very small", NM (Negative Medium) represents "small", NS (Negative Small) represents "relatively small", ZO (Zero) represents "zero", PS (Positive Small) represents "relatively large", PM (Positive Medium) represents "large", and PB (Positive Big) represents "very large".

According to the present invention, the rules are determined so as not to output outputs at four or more consecutive positions in one cycle of inference.

FIG. 3 shows a circuit arrangement for causing the center of gravity operation unit 3 to obtain a barycentral value.

Referring to FIG. 3, reference symbols A and B denote input variables. Reference numerals $11_1$ to $11_n$ denote fuzzy rule units for performing operations on input values in accordance with fuzzy rules constituted by membership functions. The rule units are arranged in units of rules. Each fuzzy rule unit comprises if-part membership function defining circuits 12 and 13, a minimum value operation circuit 14, and a then-part membership function defining circuit 15. The inferential result of each rule is output to an address selection MAX unit 16 as quantity data (area or fitness degree data) and position (address) data.

The address selection MAX unit 16 selects three positions including an area data output position in accordance with the output address (i.e., the position of the then-part membership function) of each rule and the area (i.e., the area of the then-part membership function) and supplies each maximum value corresponding to the selected addresses to a barycentral operation unit 17. For example, the smallest address of the selected three positions is output to a shift operation unit 18 as shift data.

The shift data obtained when the positions of each label, NB, NM, NS, ZO, PS, PM, and PB are addressed as indicated by Table 1 below is given as 4 (PS) for the case of FIG. 2C and 1 (NM) for the case of FIG. 2D.

TABLE 1

| Position | NB | NM | NS | ZO | PS | PM | PB |
|---|---|---|---|---|---|---|---|
| Address | 0 | 1 | 2 | 3 | 4 | 5 | 6 |

After the center of gravity position of the three positions is calculated, a value obtained by causing the shift operation unit 18 to add a result G' from the center of gravity operation unit 17 to the shift data is equal to a barycentral operation result for seven address positions (NB to PB are 0 to 6). This sum becomes a final center of gravity position.

Figure 4:
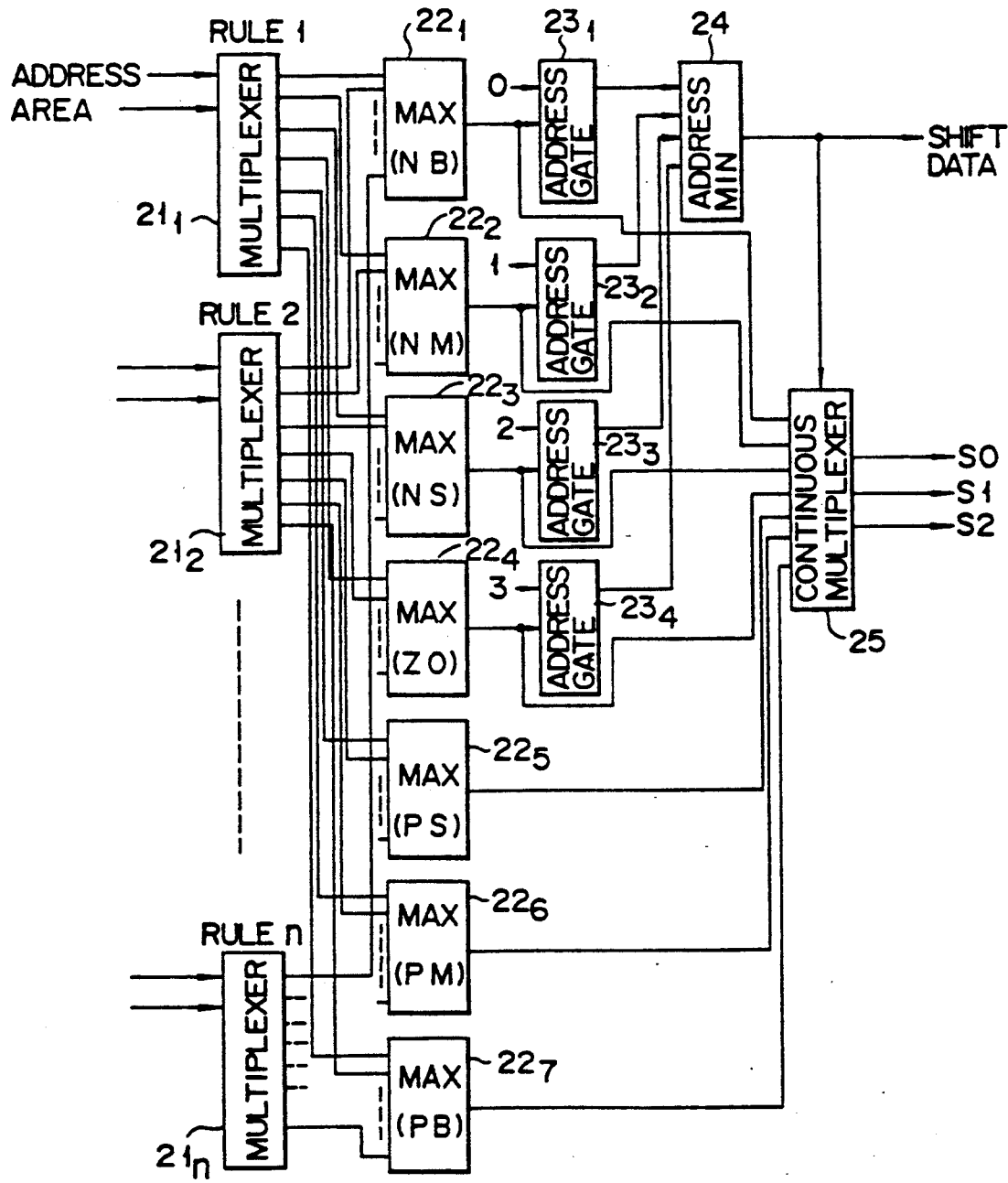
FIG. 4 is a block diagram showing the first embodiment of an address selection MAX unit.

FIG. 4 shows the first embodiment of the address selection MAX unit 16. The address selection MAX unit 16 comprises multiplexers $21_1$ to $21_n$ for assigning the rule outputs to the respective addresses, and maximum value operation circuits (MAX) $22_1$ to $22_7$ which respectively correspond to the addresses (positions)

NB, NM, NS, ZO, PS, PM, and PB of the then-part membership function and which calculate maximum values on the basis of the assigned data. The rule outputs from the fuzzy rule units $11_1$ to $11_n$ are assigned to the respective addresses to calculate a maximum value in the same manner as described above.

As shown in FIG. 4, outputs from the maximum value operation circuits $22_1$ to $22_4$ are connected to address gate units $23_1$ to $23_4$, respectively. Outputs from the address gate units $23_1$ to $23_4$ are supplied to an address MIN unit 24. The address MIN unit 24 calculates a minimum value of the outputs from the address gate units $23_1$ to $23_4$ and sends them to a continuous multiplexer 25. The continuous multiplexer 25 receives the outputs from the maximum value operation circuits $22_1$ to $22_7$ and limits area outputs to three positions S0, S1, and S2 in accordance with the minimum value from the address MIN unit 24.

Figure 5:
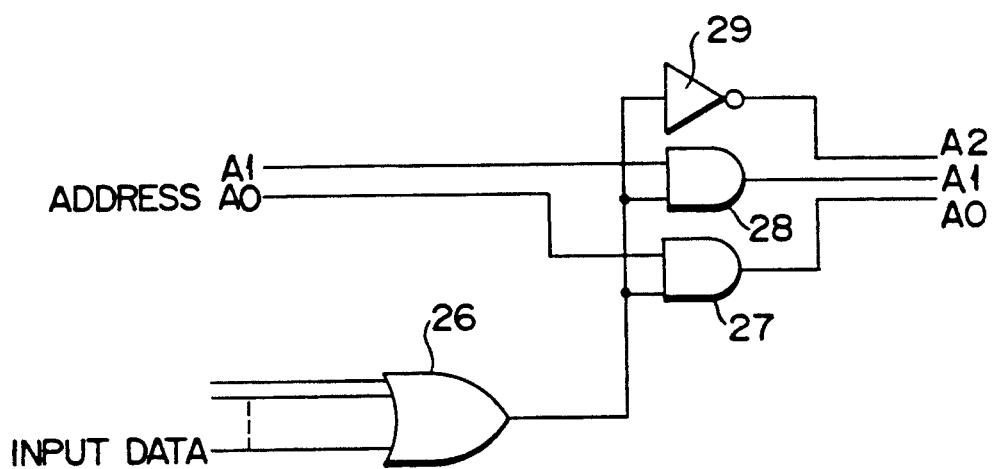
FIG. 5 is a circuit diagram of an address gate unit.

As shown in FIG. 5, each of the address gate units $23_1$ to $23_4$ comprises an OR gate 26, AND gates 27 and 28, and an inverter 29, all of which are connected to each other and operated as follows. The area data is input to an input data section. The input data section has input lines corresponding in number to the bits of the area data. An address input section can represent values 0 to 3 by using two bits A0 and A1. Since the address data NB to ZO are input to the address input section, a 2-bit arrangement can be enough. An output from the address gate unit is 3-bit data, i.e., A0, A1, and A2. When an area input is not "0", that is, when all the input bits of the input data is not "0", the output of OR gate 26 becomes "1" and therefor addresses A0 and A1 are output from AND gates 27 and 28. On the other hand, when an area input is "0", that is, when all the input bits of the input data are "0", outputs A0 and A1 of the AND gates 27 and 28 become "0" respectively because the output of the OR gate 26 represents "0" and output A2 of the inverter 29 becomes "1". Therefore, output address A2, A1, and A0 represent "100", which means 4 in the decimal system. Although in this embodiment the input address is output as it is when the input data exceeds zero, another circuit construction is possible. For example, if logic circuits are provided prior to OR gate 26, the input address is output as it is when the input data exceeds a nonzero given value.

Referring back to FIG. 4, when outputs from the maximum value operation circuits $22_1$ to $22_4$ are "0"s, respectively, all outputs from the address gate units $23_1$ to $23_4$ are "4"s, respectively. An output from the address MIN unit 24 is "4". The continuous multiplexer 25 outputs an address "4,5,6", i.e., selects the area of the addresses PS, PM, and PB which are respectively output to the outputs S0, S1, and S2. When an area output shown in FIG. 2D is to be performed, the outputs from the address gate units $23_1$ to $23_4$ are "4", "1", "2", and "3" in the order named. An output from the address MIN unit 24 becomes "1". Therefore, addresses of "1", "2", and "3", i.e., NM, NS, and ZO which define a specific area are output to the outputs S0, S1, and S2 of the continuous multiplexer 25.

As described above, the address MIN unit 24 is a simple minimum value operation circuit, and the continuous multiplexer 25 is a multiplexer for selecting and outputting an area of three consecutive positions from the shift data value which is output from the address MIN unit 24.

Figure 6:
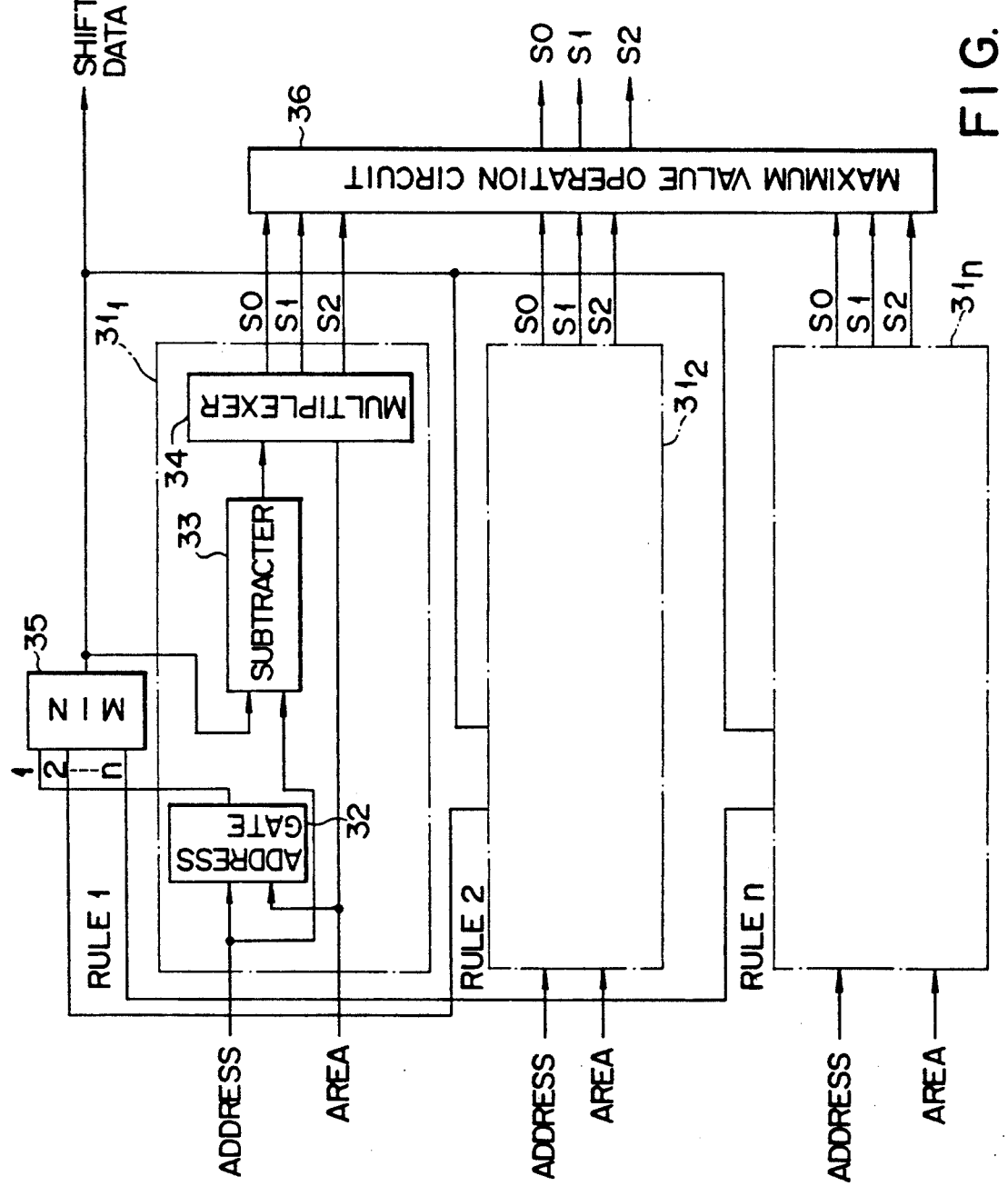
FIG. 6 is a block diagram showing the second embodiment of an address selection MAX unit.

FIG. 6 shows the second embodiment of an address selection MAX unit 16. Circuits $31_1$ to $31_n$ are connected to the fuzzy rule units $11_1$ to $11_n$, respectively. Each of the circuits $31_1$ to $31_n$ comprises an address gate unit 32, a subtracter 33, and a multiplexer 34, all of which are connected as shown in FIG. 6. The circuit construction of the address gate unit 32 is the same as that of FIG. 5. All outputs from the address gate units 32 of the circuits $31_1$ to $31_n$ are input to minimum value operation circuits (MIN) 35, respectively. The minimum values of the address gates of the rules are input to the next subtracters 33.

Each subtracter 33 calculates a difference between an address and a minimum value of an address gate. When the output of the subtracter 33 is "0", the multiplexer 34 outputs an area value to the output S0 and when the output of the subtracter 33 is one of "1" and "2", the multiplexer 34 outputs an area value to one of the outputs S1 and S2. If an area is detected, an area value is output to any of outputs S0 to S2 of the multiplexer 34. In this case, the output positions are the same as those in FIG. 4, and a detailed description thereof will be omitted.

When a difference output from the subtracter 33 is a negative value or 3 or more, the area value must be "0". In this case, any output of the multiplexer 34 can be output without posing any problem. Finally, a maximum value operation circuit 36 calculates maximum values of the outputs S0 to S2 of the circuits $31_1$ to $31_n$ and serves as the address selection MAX unit 14 of FIG. 4.

FIG. 7 shows the third embodiment of an address selection MAX unit 16. The address selection MAX unit 16 shown in FIG. 7 is substantially the same as that of the second embodiment (FIG. 6) except that minimum and maximum value operation circuits are connected according to a wired OR scheme. For this reason, in addition to address gate units 32, subtracters 33, and multiplexers 34, circuits $31_1$ to $31_n$ include minimum value operation circuits 35' and maximum value operation circuits $36_0$, $36_1$, and $36_2$. Reference symbols R in FIG. 7 denote pull-up resistors. The circuit construction of the minimum value operation circuit 35' is the same as that of the open drain minimum value operation circuit of FIG. 51 disclosed in U.S. Patent Application No. 426,576 which is owned by the owner of the present invention and therefore the detailed explanation for the circuit 35' is omitted.

The barycentral operation unit 17 shown in FIG. 3 will be described below. As described above, the area outputs are limited to the three positions S0, S1, and S2. Therefore, a center of gravity value of the three positions S0, S1, and S2 from the address selection MAX unit 16 need only be calculated. If the addresses of the positions S0, S1, and S2 are given as "0", "1", and "2", a center of gravity value G' is calculated as follows:

$$G' = \{(0 \times S0) + (1 \times S1) + (2 \times S2)\}/$$
$$(S0 + S1 + S2)$$
$$= \{(S1 + S2) + S2\}/\{S0 + (S1 + S2)\}$$

The above algorithm is represented by a circuit shown in FIG. 8. Three adders 41, 42, and 43 and one divider 44 are connected, as shown in FIG. 8.

The center of gravity value G' from the barycentral operation unit 17 is input to the shift operation unit 18. The shift operation unit 18 adds shift data to the center of gravity value G' in order to convert the barycentral value G' into a center of gravity value of NB to PB (addresses 0 to 6), i.e., a final barycentral value. In practice, since decimal data is difficult to handle, the following calculation is performed:

$$G'' = [\{(S1+S2)+S2\}/\{S0+(S1+S2)\}] \times 2^n$$

where n is the address division count.

In order to match weighting of the final center of gravity value G" with that of the shift data, the shift data must also be multiplied with 2n. The center of gravity value after the address division is obtained by calculating:

$$G'' + (shift\ data \times 2^n)$$

This calculation is achieved by a circuit arrangement shown in FIG. 9. A shift circuit 45 and an adder 46 are connected, as shown in FIG. 9.

Figure 10:
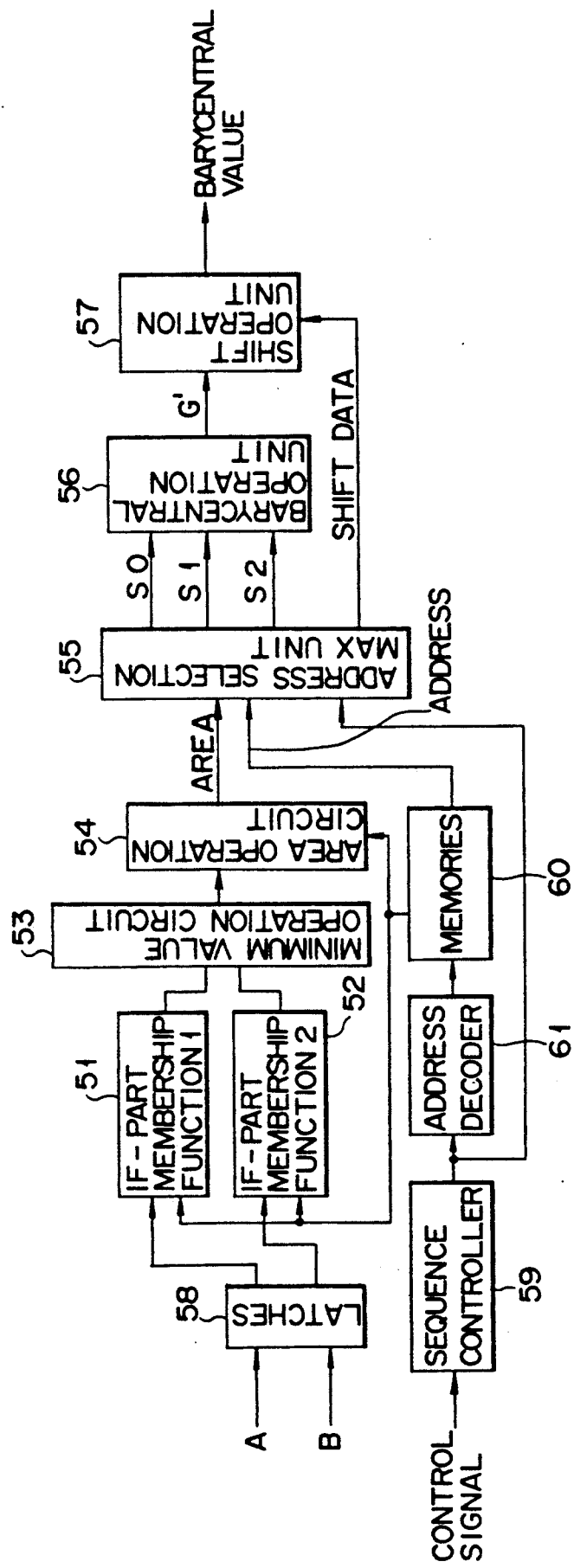
FIG. 10 is a block diagram of a time-divisional digital fuzzy circuit.

FIG. 10 shows a fuzzy circuit for one rule in which a membership function can be set using parameters. This fuzzy circuit exemplifies a time-divisional digital fuzzy apparatus in which the parameters are switched in synchronism with clock signals to perform inference using a plurality of fuzzy rules.

Referring to FIG. 10, reference numerals 51 and 52 denote if-part membership function defining circuits; 53, a minimum value operation circuit; 54, an area operation circuit; 55, an address selection MAX unit; 56, a center of gravity operation unit; 57, a shift operation unit; 58, latches for distributing two-series input variables into the if-part membership function defining circuits 51 and 52; 59, a sequence controller for generating time-divisional control timing signals and the like; 60, memories for storing definition parameters of if- and then-part membership functions in units of rules; and 61, an address decoder for addressing the memories 60 in response to timing signals from the sequence controller 59.

The principle of the present invention can be applied to the above circuit, and a simple circuit can be realized. The operations of the barycentral operation unit 56 and the shift operation unit 57 are the same as those described above, and a detailed description thereof will be omitted.

FIG. 11 shows an arrangement of an address selection MAX unit 55 used in the time-divisional digital fuzzy apparatus shown in FIG. 10. In this case, the inference order of the fuzzy rules operated in synchronism with clock signals is an output address order (i.e., in an order of 0 to 6 in this embodiment) of each then-part membership function.

A cycle pulse is a pulse output from the system example, when six fuzzy inferential operations are to be performed, one pulse is output for six clock signals. An address latch unit 72 and shift MAX units (maximum value operation units) 750' 751, and 752 are reset in response to the cycle pulse and are ready for the next cycle of inference.

A zero determining unit 71 is a circuit for generating an output when the input area is not "0". The address latch unit 72 stores the address corresponding to the first non- "0" of the area until the next cycle pulse is input. The operations of a subtracter 73 and a multiplexer 74 may be the same as the circuits described above (e.g., multiplexers in FIGS. 6 and 7).

An address corresponding to the first non-"0" of the area is selected as S0, and the subsequent three addresses are assigned to S0 to S2 (the address corresponding to the first non-"0" of the area is a minimum value of the output area address since the outputs are arranged in an order of output addresses according to the fuzzy rule). In this manner, since the area except for the three addresses described above represents "0", no problem occurs regardless of different addressing schemes for S0 to S2.

In the embodiment described above, the center of gravity position is calculated for the areas of three consecutive addresses, based on a minimum address position in which the area is nonzero. However, the present invention is not limited to this embodiment. For example, more than three or less than three consecutive addresses can be used and a predetermined value other than zero will be used as an area input. The barycentral position can be detected for a consecutive address in a decreasing, order by detecting a maximum address. Further, the center of gravity position can be obtained based on addresses obtained when consecutive areas of more than 2 exceed a predetermined value.

In the digital fuzzy apparatus according to the present invention, as has been described in detail, the inferential result of each fuzzy rule is input to the maximum value operation unit as quantity data and position data. The maximum value operation unit determines a fuzzy quantity at each position and limits positions except for a portion where fuzzy quantities are not present at corresponding positions, i.e., except for the non-output portion based on the rule. The maximum values are calculated on the basis of the limited positions. The operation result and the limited position data are input to a center of gravity operation units. The center of gravity operation unit calculates a barycentral value of the limited positions on the basis of the maximum values. The center of gravity value operation result and the limited position data are used to correct the center of gravity position. Therefore, the circuit arrangement of the center of gravity operation unit can be simplified, thereby obtaining a digital fuzzy apparatus suitable for an IC.

Figure 12:
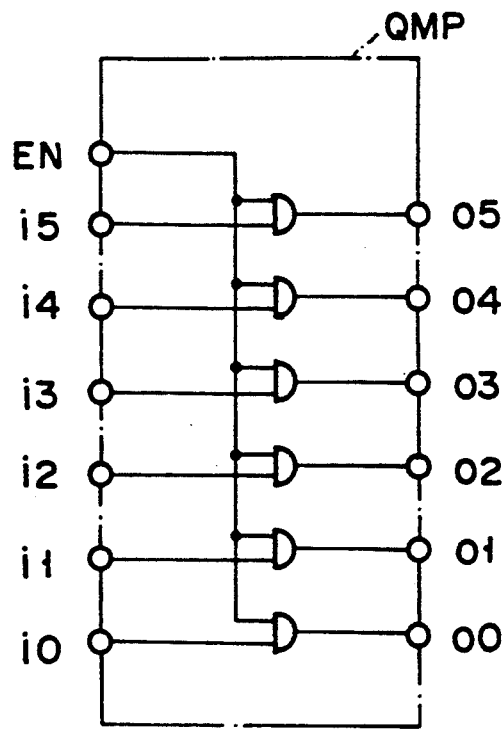
FIG. 12 is a circuit diagram for macrocell QMP shown in FIG. 14.
Figure 13:
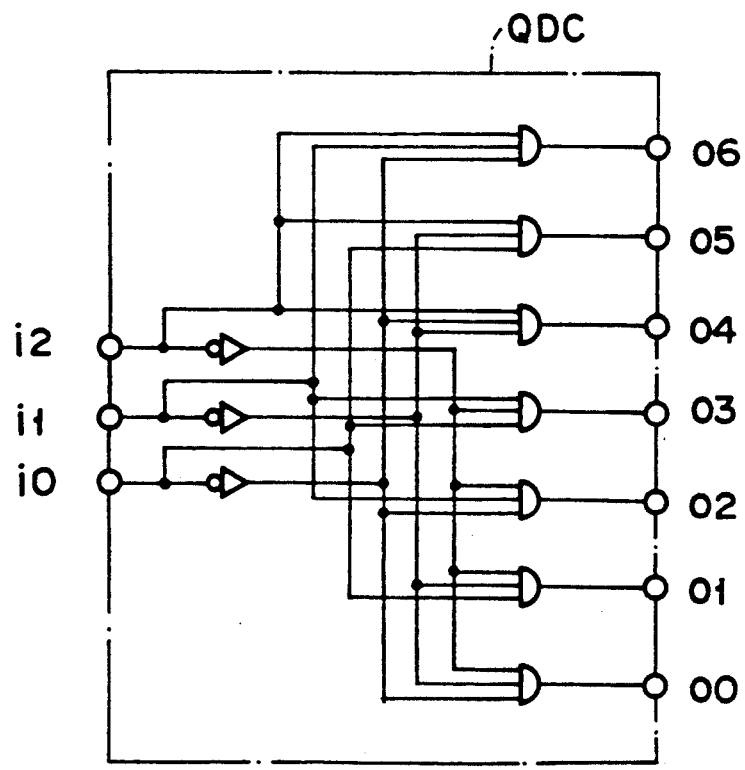
FIG. 13 is a circuit diagram for macrocell QDC shown in FIG. 14.
Figure 14:
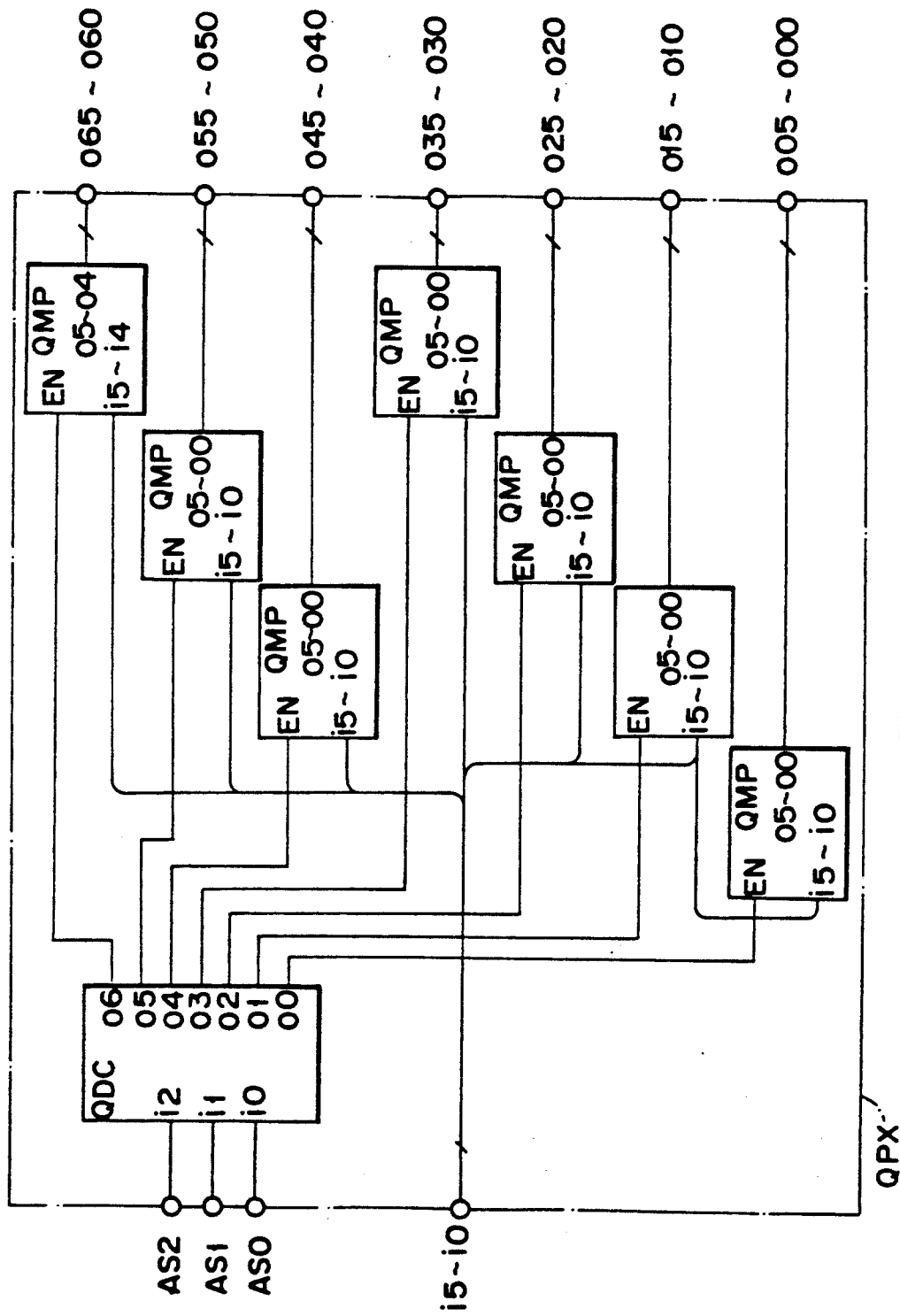
FIG. 14 is a block diagram for multiplexers $32_1$-$21_n$ shown in FIG. 4.

FIG. 14 shows a circuit QPX internally equivalent to the multiplexers $21_1$-$21_n$ shown in FIG. 4, and the main inputs/output terminals are address inputs terminals AS2-AS0, area input terminals i5-i4, and multiplexer output terminals (o65-o60)-(o45-o44). Macrocells QDC and QMP, which constitute the internal structure of the circuit QPX, are as shown in FIG. 13 and 12, respectively. The macrocell QDC is a line decoder which decodes an address input (3 bits) from 0 to 6 (NB-PB), and the macrocell QMP is an AND gate constituted by 6 bits in which input signals of input terminals i5-i4 are output to output terminals o5-o4 when the EN terminal is H. It is a matter of convenience that the area signals input to multiplexers $21_1$-$21_n$ are set to have 6 bits. The number of bits used for these area signals are, of course, determined by the signals used in the if-part membership function (especially, the number of bits of the grade of the membership function).

Figure 15A:
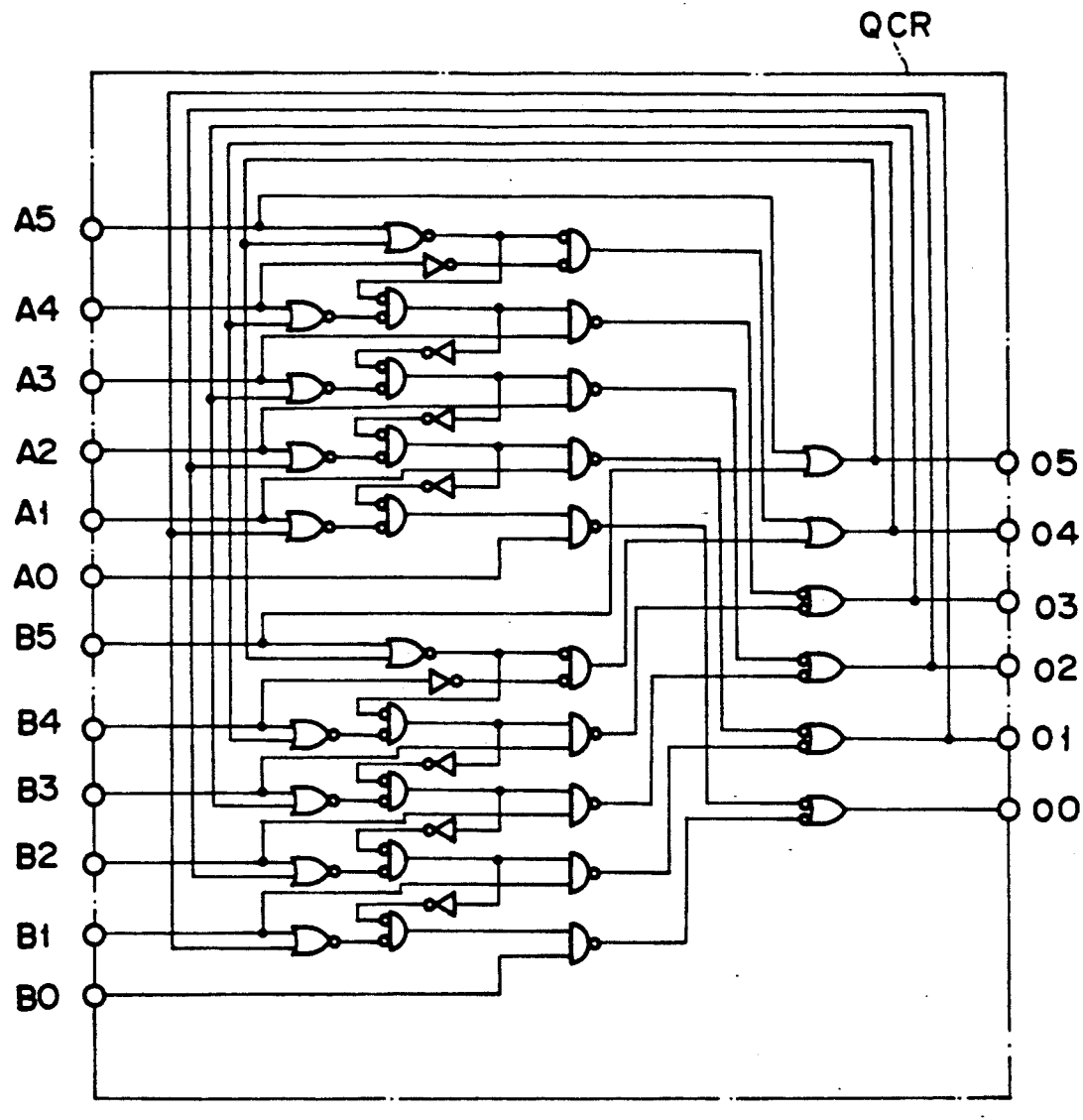
FIG. 15A is a circuit diagram for macrocell QCR shown in FIG. 16.
Figure 16:
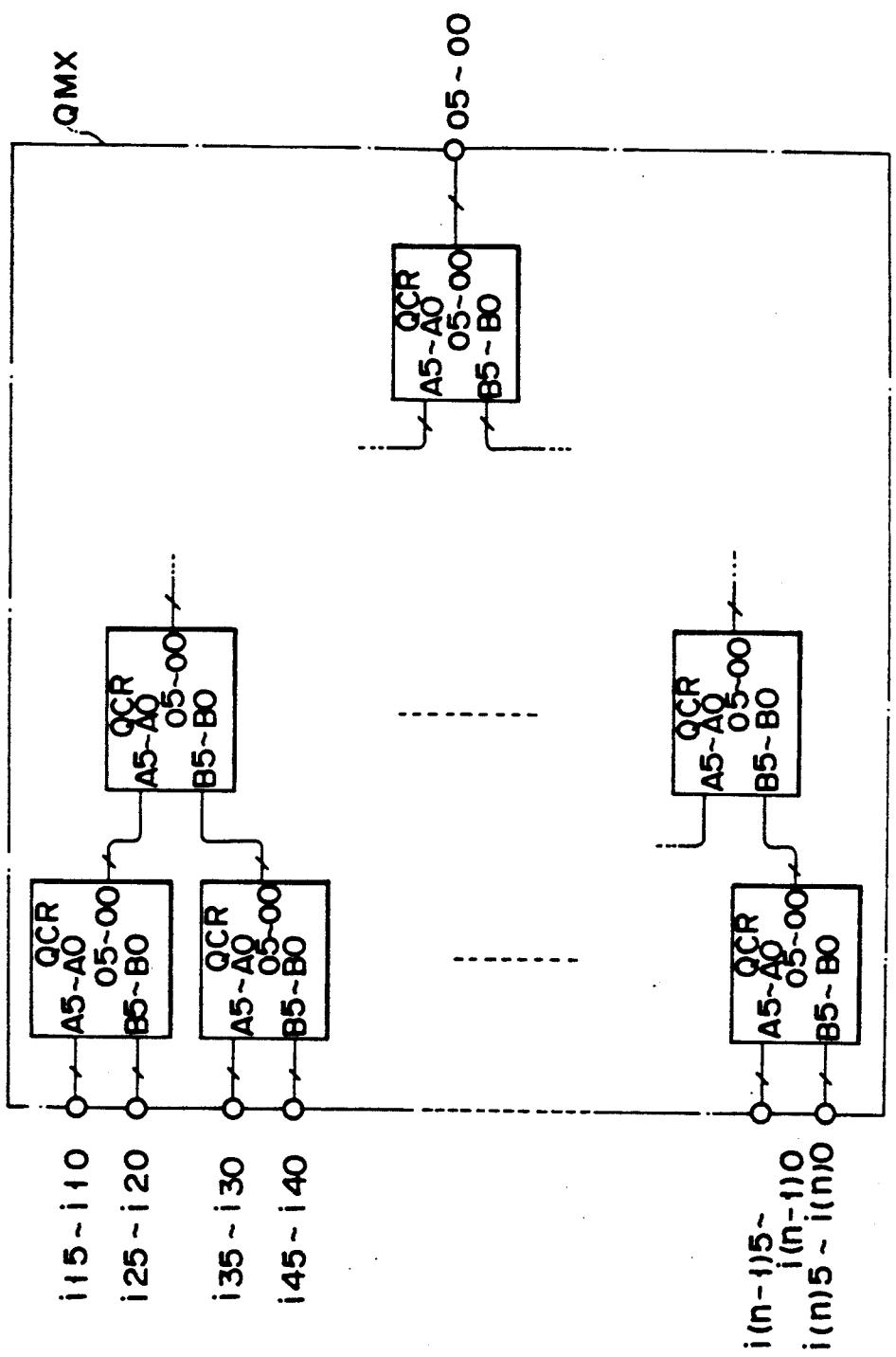
FIG. 16 is a block diagram for maximum value operation circuits $22_1$-$22_7$ shown in FIG. 4.

FIG. 16 shows a circuit QMX internally equivalent to the maximum value operation circuits $22_1$-$22_7$ shown in FIG. 4, and the main inputs/output terminals are inputs input terminals (i15-i14)-(in5-in4) the number of which corresponds to that of rules to each other which outputs (7 outputs corresponding to the then-part membership functions NB-PB) of multiplexer $21_1$-$21_n$ are input, and output terminals o5-50 from which the maximum input signal is output. FIG. 15A shows a macrocell which constitutes the internal structure of the circuit QMX, and functions in accordance with the table of truth values shown in FIG. 15B.

Figure 18:
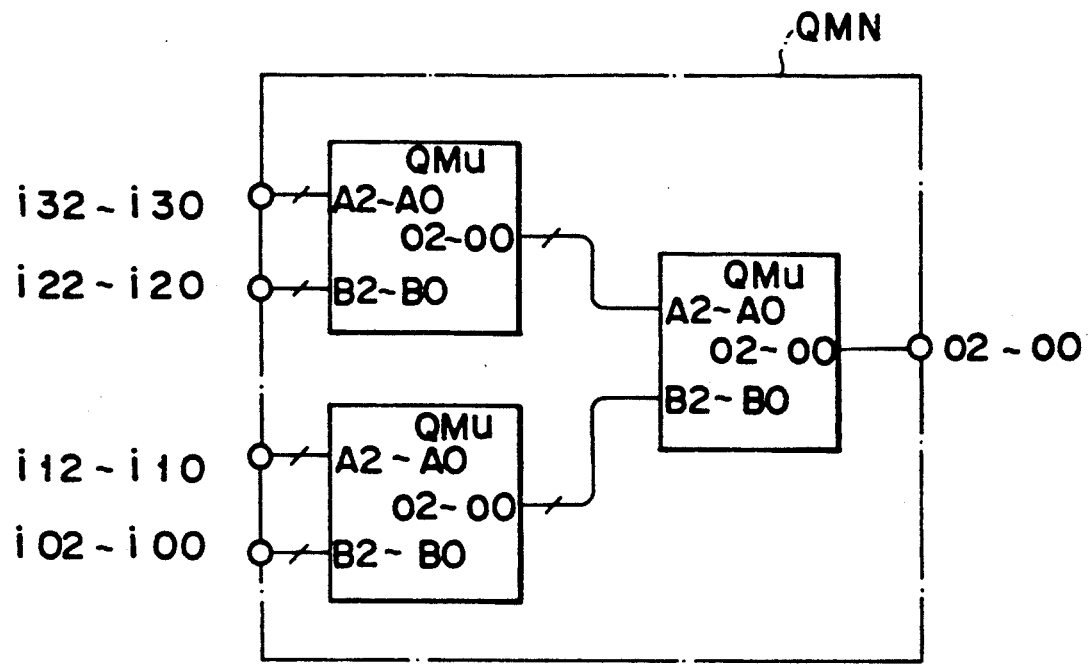
FIG. 18 is a block diagram for the address MIN 24 shown in FIG. 4.

FIG. 18 shows a circuit QMN internally equivalent to the address MIN 24 shown in FIG. 4, and the main inputs/output terminals are inputs input terminals (i32-i30)-(i42-i44) to which outputs from four address gates $23_1$-$23_4$, and output terminals o2-o4 from which the maximum input signal is output. FIG. 17A shows a macrocell QMU which constitutes the internal structure of the circuit QMN shown in FIG. 18, and functions in accordance with the table of truth values shown in FIG. 17B.

Figure 19:
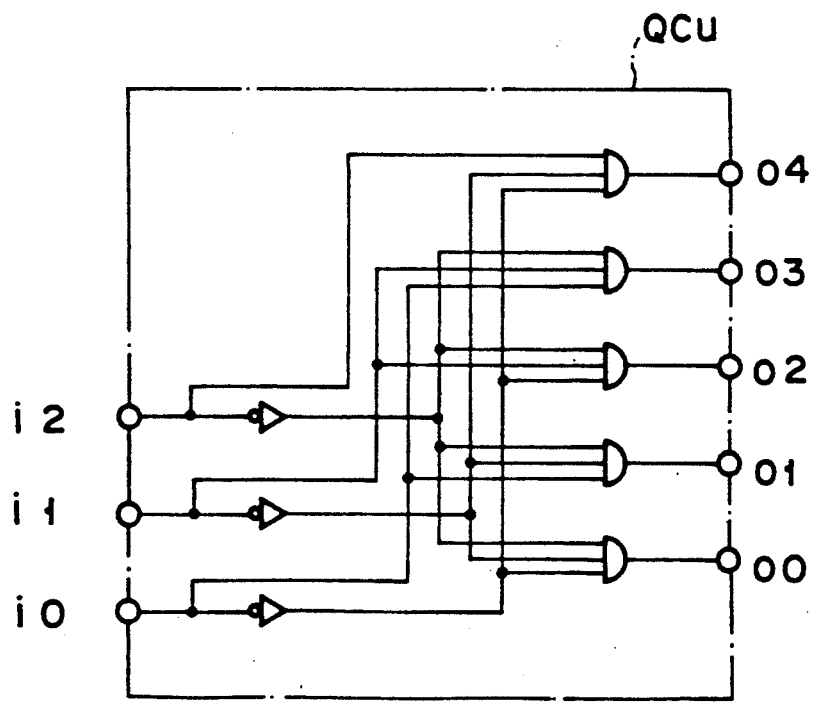
FIG. 19 is a circuit diagram for macrocell QCU shown in FIG. 20.
Figure 20:
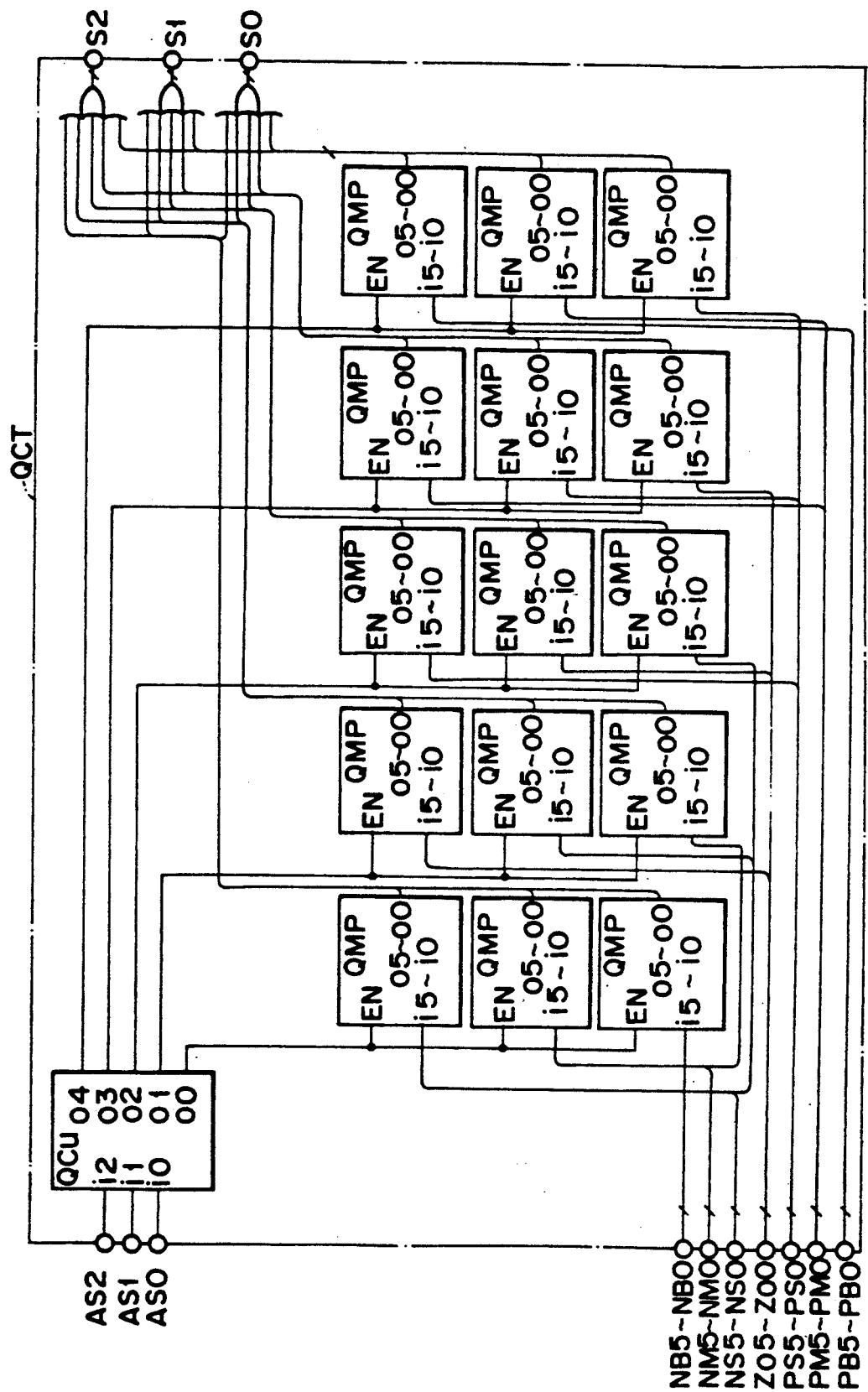
FIG. 20 is a block diagram for the continuous multiplexer 25 shown in FIG. 4.

FIG. 20 shows a circuit QCT internally equivalent to the continuous multiplexer 25 shown in FIG. 4, and the main inputs/outputs terminals are inputs terminals AS2-AS0 to which the minimum value output (shift data) output from address MIN 24, input terminals (NB5-NB0)-(PB5-PB0) to which the maximum output from the maximum value operation circuits $22_1$-$22_7$, is input, and output terminals S2-S4 from which output signals of three consecutive then-part membership function (NB-PB) are output, the values of these output signals determined by shift data (0-4). FIG. 19 shows a macrocell QCU which constitutes the internal structure of the circuit QCT shown in FIG. 20, and the macrocell QCU is a line decoder which decodes the shift data (3 bits) from 0 to 4. Each of the decode outputs corresponds to the respective multiplexer, one unit of a multiplexer being equivalent to 3 QMPs.

FIG. 21 shows a circuit QNi internally equivalent to the MIN shown in FIG. 6, and the main inputs/output terminals are address input terminals (i12-i14)-(in2-in4), and output terminals 02-04 from which the maximum value of input signals is output.

Figures 22B, 23:
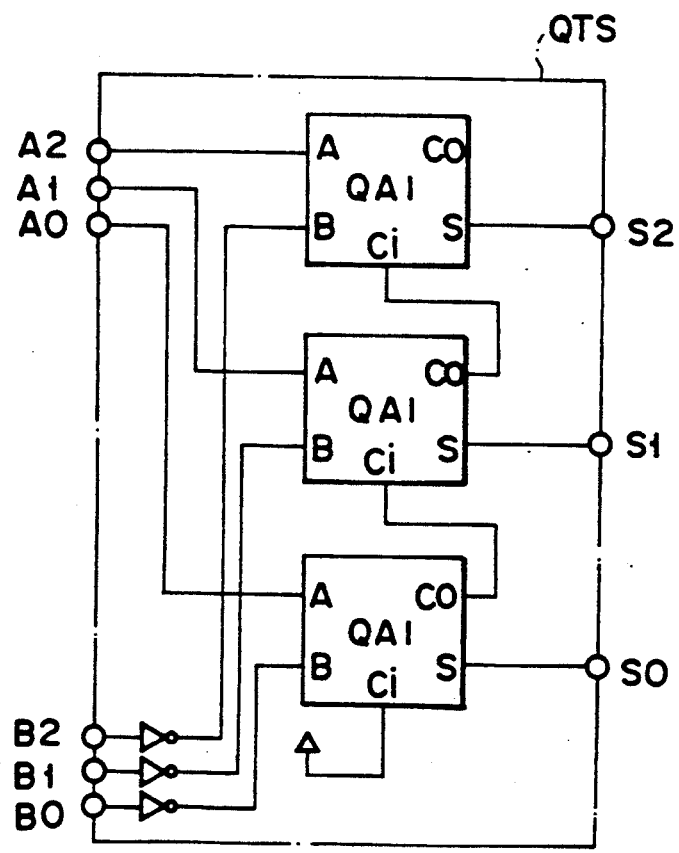
FIG. 22B is a truth table for operation of macrocell QAI shown in FIG. 22A.
FIG. 23 is a block diagram of subtracter 33 shown in FIG. 6.

FIG. 23 shows a circuit QTS internally equivalent to the subtracter 33 shown in FIG. 6, and the main inputs-/output terminals are input terminals A2-A0 and B2-B0 to which outputs (shift data) of MIN 35 is input, and output terminals S2-S0 which outputs output results.

FIG. 22A shows a macrocell QAI (1-bit total adder) which constitutes the internal structure of the circuit QMX, and functions in accordance with the table of truth values shown in FIG. 22B.

FIG. 24 shows a circuit QPN internally equivalent to the multiplexer 34 shown in FIG. 6, and the main inputs/output terminals are input terminals AS2-AS0, input terminals i5-i0 to which area signals are input, and multiplexer outputs (o25-o20)-(o45-o00). The macrocell QCu (line decoder) in the QPN selects only one QMP out of three based on the value of the output of the subtracter.

Figure 25:
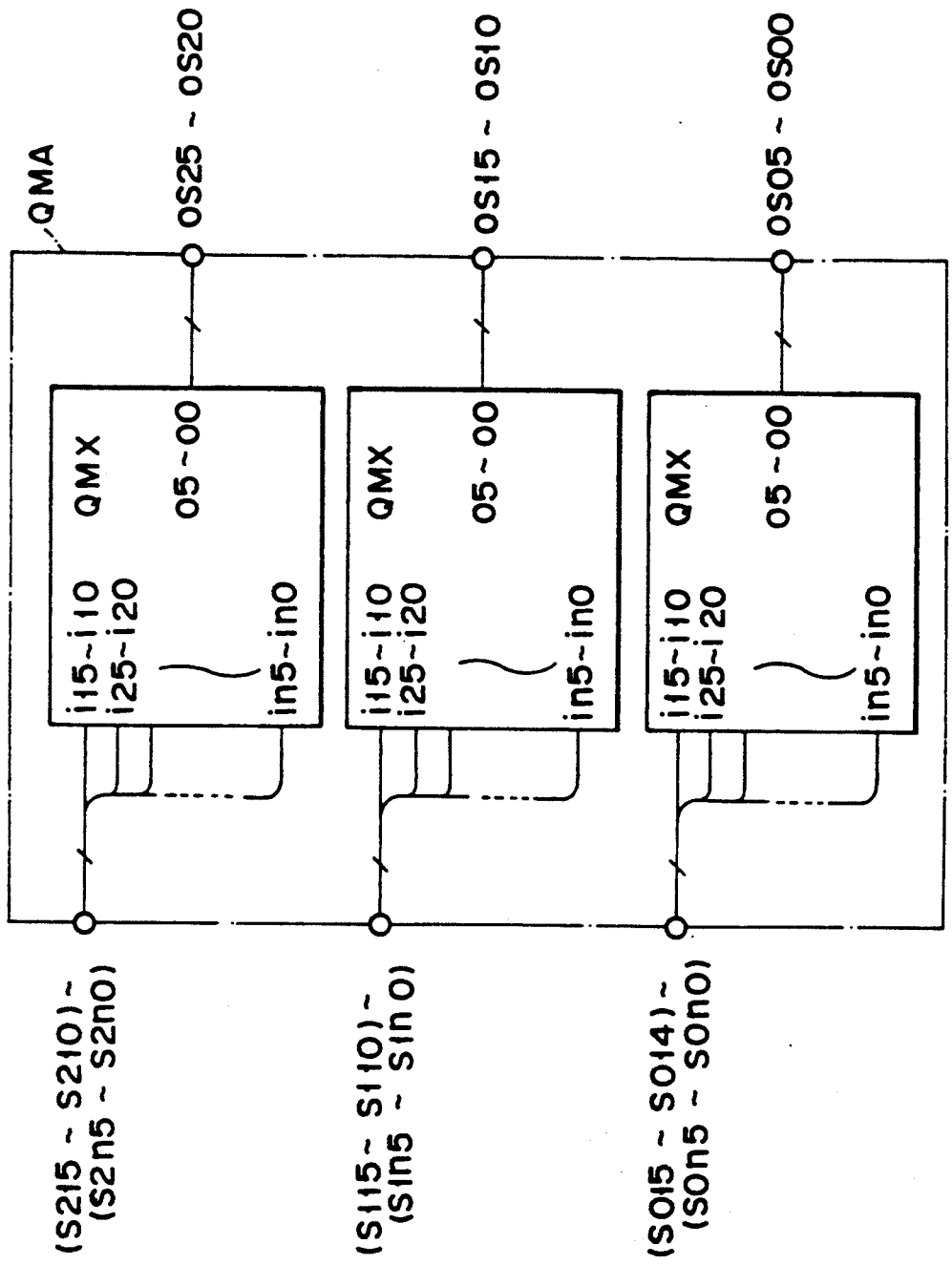
FIG. 25 is a block diagram of maximum value operation circuit 36 shown in FIG. 6.

FIG. 25 shows a circuit QMA internally equivalent to the maximum value operation circuit 36 shown in FIG. 6, and the main inputs/output terminals are input terminals [(S215-S210)-(S2n5-S2n0)], [(S115-S110)-(S1n5-S1n4)], and [(S015-S010)-(S0n5-S0n0)], to which output signals (S2-S0) from multiplexer 34 for each rule are input, and output terminals (oS25-oS20), (oS15-oS14), and (oS05-oS00) from which the maximum value of the input signals is output. Input signals (i15-i10)-(in5-in0) of the internal macrocell QMX of the circuit QMA changes its value in accordance with the number of rules. The 0.P. MIN 35 and 0.P. MAX 36 shown in FIG. 7 are explained in detail in Published Unexamined Japanese Patent Application (PUJPA) No. 63-2787797, which corresponds to the above-mentioned U.S. Ser. No. 426,576.

FIG. 26 shows a circuit QSA internally equivalent to the addition circuits 41-43 shown in FIG. 8. This circuit is a total adder, the input and output operations of which are 7 and 8 bits, respectively, and calculates numerator ($S_1+S_2+S_2$) and denominator ($S_0+S_1+S_2$) of the gravity center of value G' by adding $S_0$, $S_1$, and $S_2$ in order.

FIG. 28 shows a circuit QSB internally equivalent to the subtraction circuit 44 shown in FIG. 8. This circuit is a subtracter, the input and output operations of which are 8×2 and 7 bits, respectively, and calculates the gravity center value G' by dividing the output of the addition circuit 42 (numerator: $S_1+S_2+S_2$) by that of the addition circuit 43 (denominator: $S_0+S_1+S_2$). The main input/output terminals are input terminals (SM7-SM0) and (SC7-SC0) to which the outputs of the addition circuits 42 and 43 are input, and output terminals (SB6-SB0) which outputs the data of the division result (gravity center value G').

Figure 27:
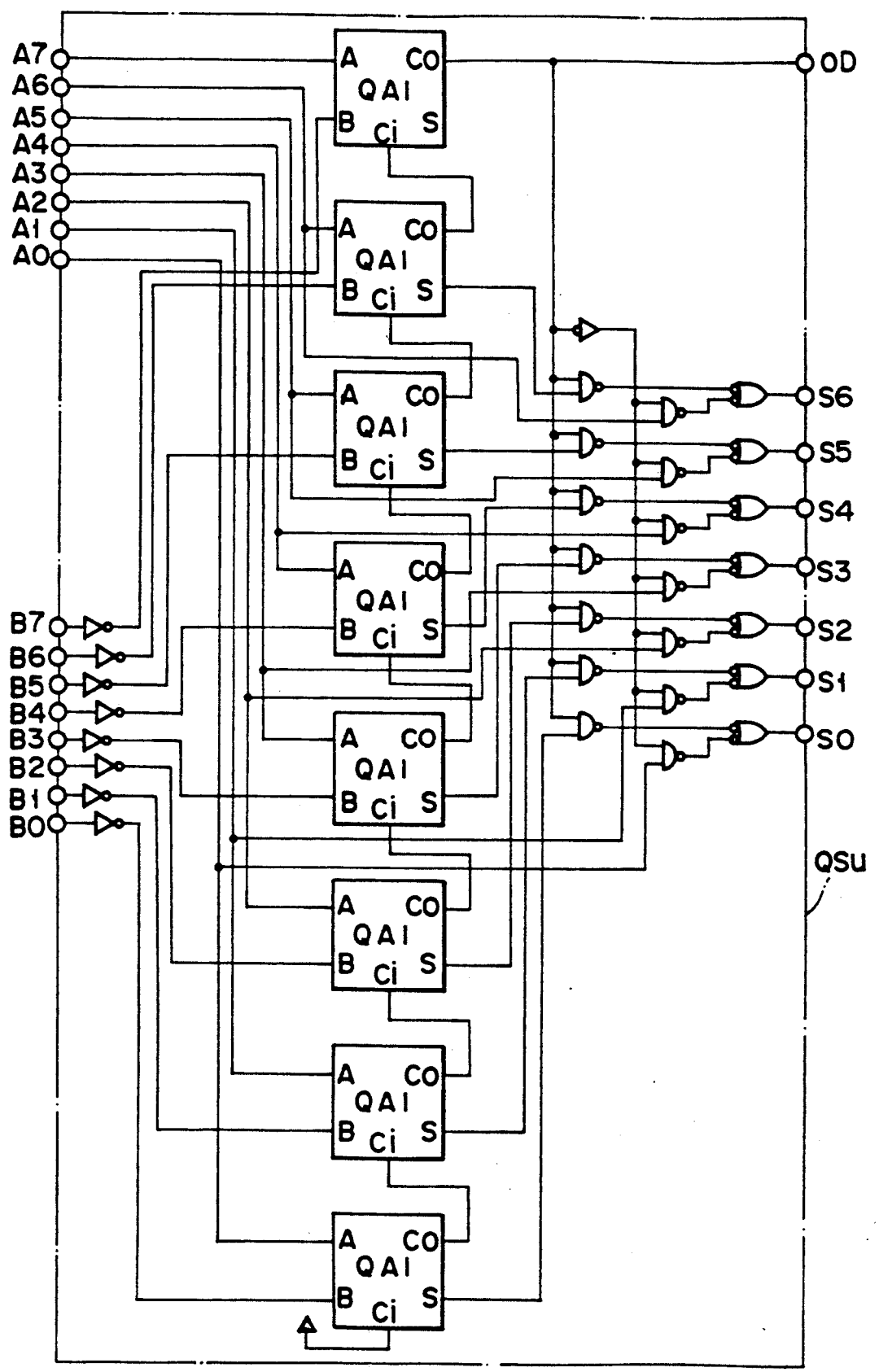
FIG. 27 is a schematic circuit diagram, partly in block, of macrocell QSU shown in FIG. 28.

FIG. 27 shows a macrocell QSu of the circuit QSB. The algorithm of the division circuit (QSB) is explained in detail in Published Unexamined Japanese Patent Application (PUJPA) No. 63-2787797, which corresponds to U.S. Ser. No. 426,576. Therefore, no explanation thereof is deemed necessary.

FIG. 30 shows a circuit QGU internally equivalent to the addition circuits 46 shown in FIG. 9. This circuit is a total adder, the input and output operations of which are 7 and 8 bits, respectively, and calculates the gravity center value of the whole by adding the gravity center value G' and the shift data. Here, a shift circuit 45 shown in FIG. 9 is omitted, and shift data is directly input to the upper 3 bits (F2-F0) of the QGU. The main input/output terminals are input terminals (E6-E0) and (F2-F0) to which the gravity center value G' and shift data are input, and output terminals (GV9-GV4) from which the data of the addition results (the gravity center of the whole) is output. FIG. 29 shows a macrocell QST, which is a part of the internal structure of the circuit QGU.

Figure 31:
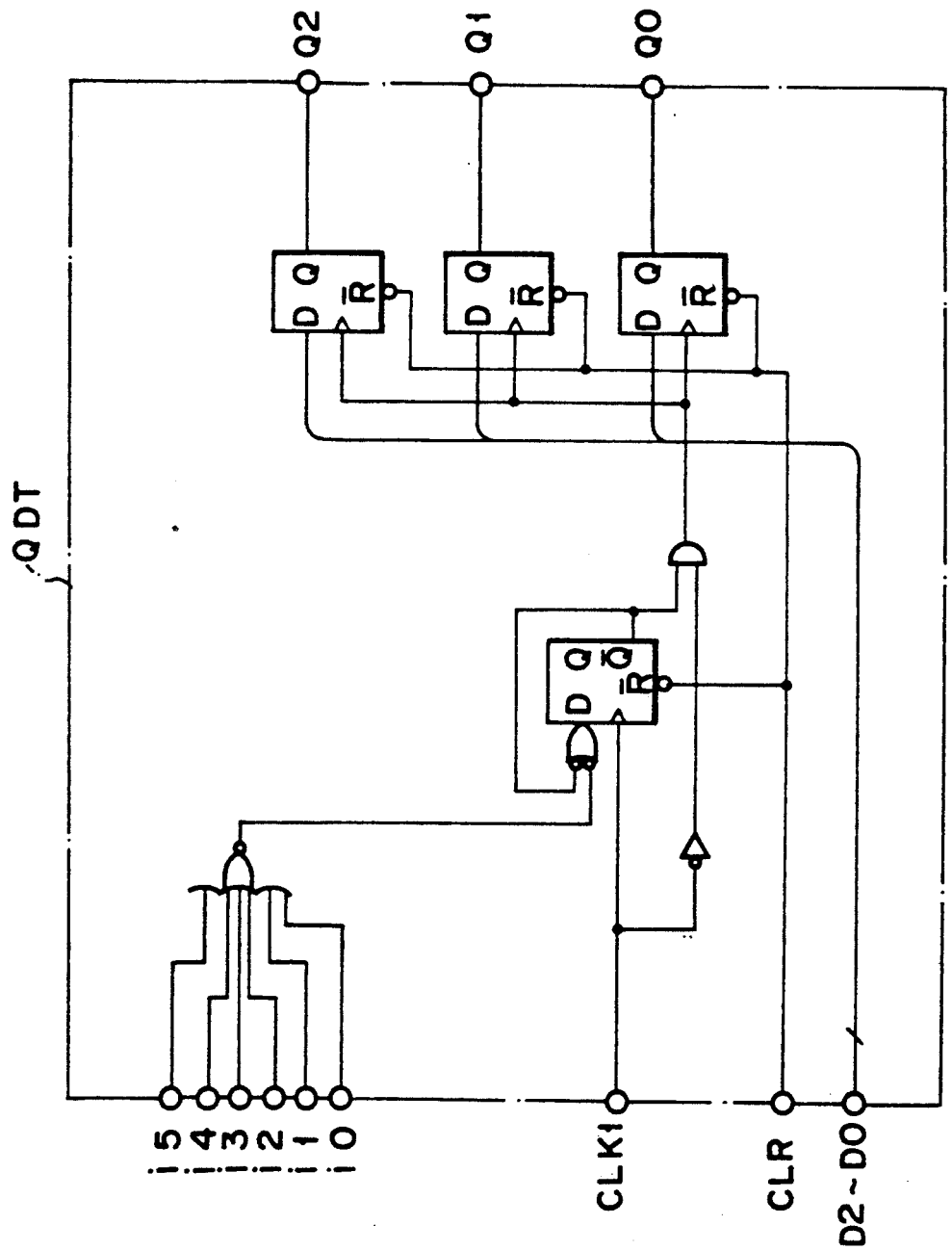
FIG. 31 is a circuit diagram of zero judgement portion 71 and address latch portion 72 shown in FIG. 11.
Figure 32:
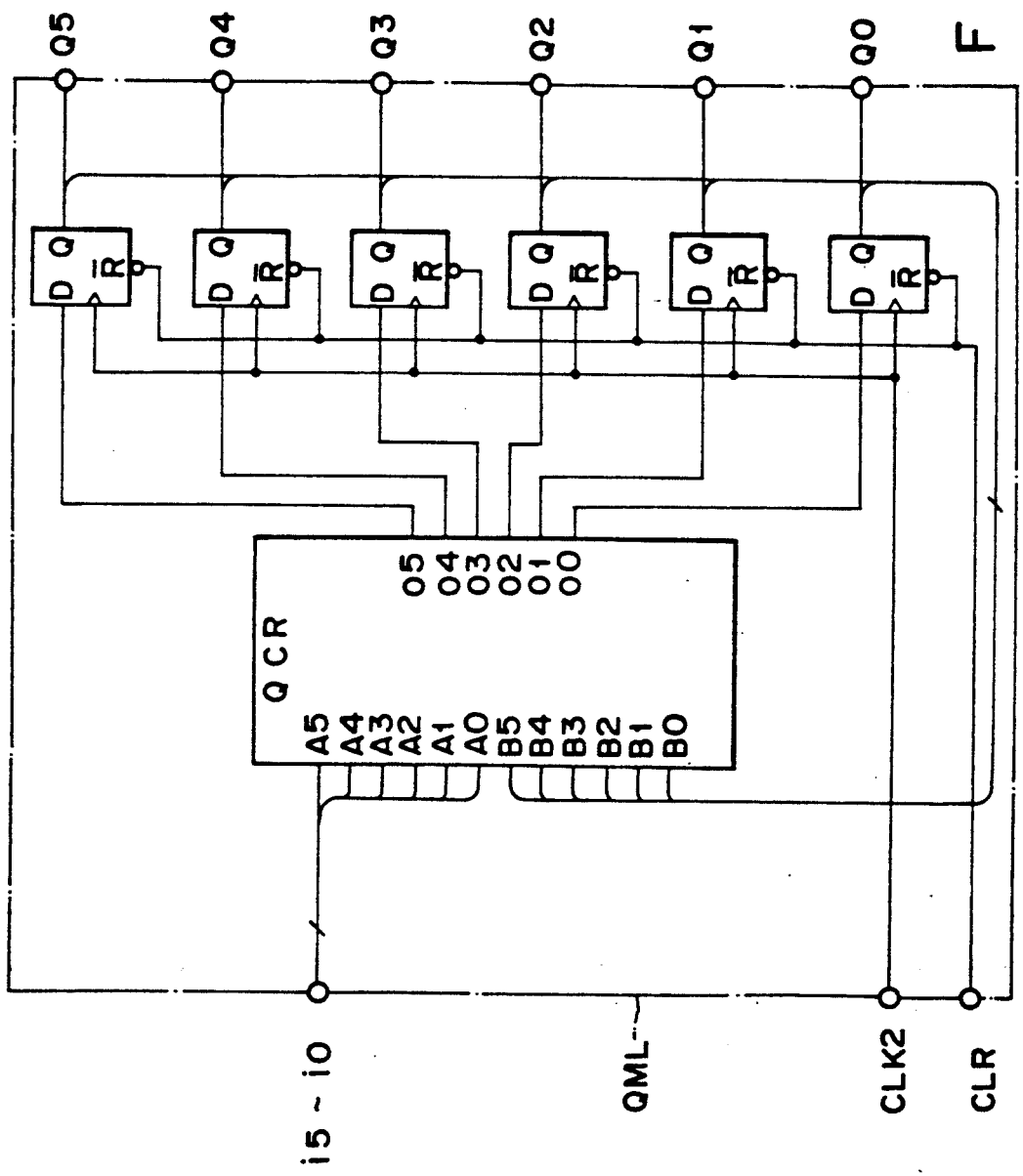
FIG. 32 is a schematic circuit diagram of shift MAX $75_0$–$75_2$ shown in FIG. 11.

FIGS. 31 and 32 show internal equivalent circuits illustrating the internal block figure (FIG. 11) of the address selecting MAX portion 55 shown in FIG. 10. FIG. 31 shows a circuit QDT internally equivalent to the zero judgment portion 71 and address latch portion 72 shown in FIG. 11, and this circuit determines outputs (Q2-Q0) based on the presence or absence of the area (if input i5-i0 are all L, then the area is none). These output signals are all L before the time division control starts, since they are reset by the CLR signal. When the area starts to appear (at least one of inputs i5-i0 is H), the output signals are synchronized with the CLK signal, and inputs D2-D0 is latched off, thereby determining outputs Q2-Q0.

FIG. 32 shows a circuit QML internally equivalent to the shift MAX $75_0$-$75_2$ in FIG. 11. This circuit repeatedly (if the multiplexer outputs are input to input terminals i5-i0) compares the outputs from the multiplexer 74 for obtaining the maximum value, and outputs, at the end, the signal of the maximum value to the output terminals Q5-Q0 of $S_2$-$S_0$.

Figure 33:
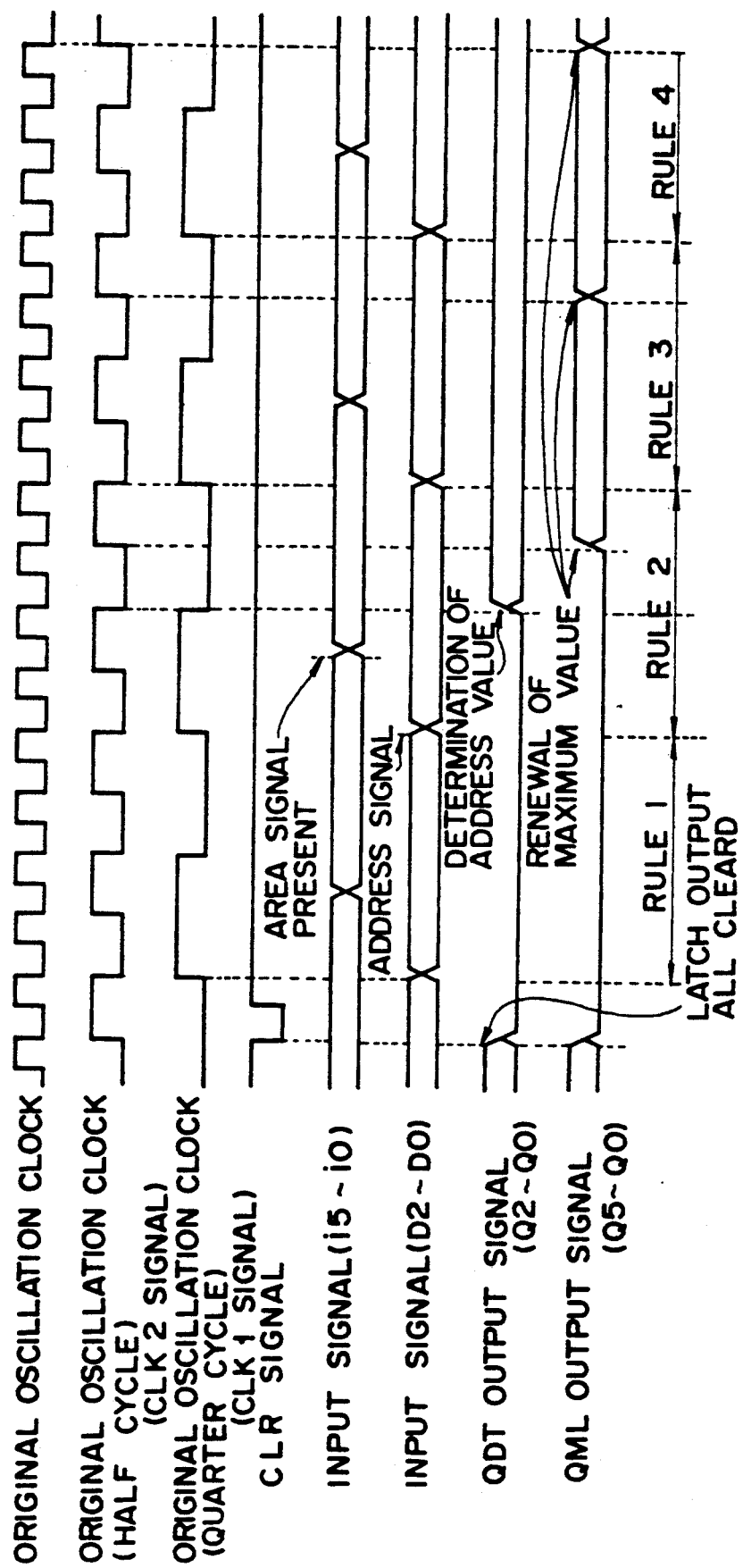
FIG. 33 is a timing diagram for signals generated in accordance with the invention.

The signal of the maximum value is all L's immediately before the time division control since they are reset by the CLR signal. Further, determination of an output based on the maximum value comparison is carried out in synchronism with the CLK signal. In connection therewith, the time chart for the time division control is shown in FIG. 33. As the subtracter 73 and multiplexer 74, the circuits QTS shown in FIG. 23 and in QPN in FIG. 24 are used.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A digital fuzzy apparatus comprising:
   fuzzy rule operating circuit for performing an operation on an input value in accordance with fuzzy rules constituted by membership functions and outputting address position data and fitness degree data in units of rules;
   maximum value operating circuit for calculating a maximum value of the fitness degree data output from said fuzzy rule operating circuit at each address position corresponding to the fitness degree data;
   address selecting circuit for selecting an effective range on the basis of an address position at which the maximum value of the fitness degree data output in units of address positions exceeds a predetermined value;
   center of gravity position operating circuit for calculating a center of gravity position in accordance with the address positions of the effective range and the fitness degree data output from said maximum value operating circuit in correspondence with the address positions of the effective range; and
   output circuit for obtaining a final center of gravity position and outputting the final center of gravity position as an inference result in accordance with the center of gravity position output from said center of gravity position operating circuit and the address positions selected by said address selecting circuit.

2. An apparatus according to claim 1, wherein said fuzzy rule operating circuit comprises:
   a plurality of if-part membership function operating circuits for performing an operation on the input values on the basis of a plurality of if-part membership functions, respectively;
   minimum value operating circuit for calculating a minimum value of operation results from said plurality of if-part membership function operating circuits; and
   then-part membership function operating circuit for receiving the minimum value and outputting address positions and the fitness degree data on the basis of a then-part membership function.

3. An apparatus according to claim 1, wherein said address selecting circuit selects a predetermined number of consecutive address positions from the address position at which the maximum value corresponding to the address position output from said maximum value operating circuit exceeds the predetermined value and defines the selected address positions as the effective range.

4. An apparatus according to claim 3, wherein said output circuit comprises a shift circuit for shifting the center of gravity position operated by said center of gravity position operating means with reference to the address position at which the maximum value exceeds the predetermined value.

5. A digital fuzzy apparatus comprising:
   fuzzy rule operating circuit for performing an operation on an input value in accordance with fuzzy rules constituted by membership functions and outputting address position data and fitness degree data in units of rules;
   address selecting circuit for selecting an effective range on the basis of an address position at which the fitness degree data output from said fuzzy rule operating circuit exceeds a predetermined value;
   maximum value operating circuit for calculating a maximum value of a fitting degree data at each corresponding address position within the effective range selected by said address selecting circuit;
   center of gravity position operating means for calculating a center of gravity position of the fitting degree data in accordance with the address positions in the effective range and the fitting degree data output from said maximum value operating circuit in correspondence to the address positions; and
   output circuit for calculating a final center of gravity position and outputting the final center of gravity position as an inference result in accordance with the center of gravity position output from said center of gravity operating circuit and the address positions selected by said address selecting circuit.

6. An apparatus according to claim 5, wherein said fuzzy rule operating circuit comprises:
   if-part membership function operating circuit for performing an operation on the input values on the basis of a plurality of if-part membership functions, respectively;
   minimum value operating circuit for operating a minimum value of operation results from said plurality of if-part membership function operating circuit; and
   then-part membership function operating circuit for receiving the minimum value and outputting address positions and the fitness degree data on the basis of a then-part membership function.

7. An apparatus according to claim 6, wherein said address selecting circuit selects a predetermined number of consecutive positions from the position at which the fitness degree data output from said fuzzy rule operating circuit exceeds the predetermined value.

8. An apparatus according to claim 5, wherein said maximum value operating circuit has a wired OR arrangement.

9. An apparatus according to claim 6, wherein said output circuit comprises shift means for shifting the center of gravity position calculated by said center of gravity position operating circuit with reference to the position at which the fitness degree data exceeds the predetermined value.

10. A digital fuzzy apparatus comprising:
    fuzzy rule operating circuit for performing an operation on an input value in accordance with fuzzy rules and outputting operation results consisting of an operation value and a position as output values in units of rules;
    position selecting circuit for selecting an effective positional range on the basis of the operation values output from said fuzzy rule operating circuit;
    center of gravity position operating circuit for calculating a center of gravity position from the operation values and the position data within the positional range selected by said position selecting circuit; and a correction circuit for correcting the center of gravity position output from said center of gravity position operating circuit into a final center of gravity position.

11. An apparatus according to claim 10, wherein said fuzzy rule operating means comprises:

a plurality of if-part membership function operating circuits for performing an operation on the input values on the basis of a plurality of if-part membership functions, respectively;

minimum value operating circuit for calculating a minimum value of operation results from said plurality of if-part membership function operating circuit; and then-part membership function operating circuit for receiving the minimum value and outputting address positions and fitness degree data on the basis of a then-part membership function.

12. An apparatus according to claim 11, wherein the operation values are values representing fitness degrees for the fuzzy rules at the address positions calculated by said then-part membership function operating circuit.

13. An apparatus according to claim 11, wherein the operation values are maximum values of values representing the fitness degrees for the fuzzy rules at the address positions calculated by said then-part operating means.

14. An apparatus according to claim 11, further comprising:

memory circuit for storing plural sets of parameters for defining the if- and then-part membership functions in correspondence with the fuzzy rules; and parameter output circuit for selectively outputting parameters corresponding to a fuzzy rule in response to clock pulses, and wherein said if- and then-part membership function operating circuit receive the parameters from said parameter output circuit and output the address positions and the fitness degree data.

15. An apparatus according to claim 14, wherein said parameter output circuit outputs the parameters from the address position representing a smaller address to the address position representing a larger address or vice versa.

16. A digital fuzzy apparatus including fuzzy rule operating circuit for operating an input value in accordance with fuzzy rules constituted by membership functions and outputting fitness degree data and position data in units of rules, and inference output circuit for calculating a center of gravity position in accordance with the fitness degree data and the position data output in units of rules and outputting a fuzzy inference output, said inference output circuit comprising:

circuit for determining whether an output value from said fuzzy rule operating circuit is valid;

center of gravity position operating circuit for calculating a center of gravity position on the basis of the output value and the position data within a limited positional range; and circuit for correcting the center of gravity position in accordance with the center of gravity position and the limited positional range.

17. A digital fuzzy apparatus including:

a plurality of fuzzy rule units for outputting data representing address position data and fitness degree data on the basis of fuzzy rules constituted by membership functions;

a maximum value operation unit for calculating a maximum value of outputs from said plurality of fuzzy rule units; and a center of gravity operation unit for calculating a center of gravity value on the basis of an operation result of said maximum value operation unit, said maximum value operation unit being provided with a fitness degree determining circuit for determining whether the fitness degree of the output is valid at each address position and a position limiting circuit for limiting an address positional range having a predetermined continuous range of a maximum value operation output upon determination of said fitness determining circuit and outputting limited position data, and said center of gravity operation unit being provided with a center of gravity position correction circuit for correcting the limited center of gravity position into a final center of gravity position on the basis of the maximum value operation output and the limited address position range.

18. An apparatus according to claim 17, wherein said maximum value operation unit comprises a plurality of address gate circuits, having predetermined default values, for outputting an address position when data representing the output fitness degree is valid and the default value when the data is invalid, an address minimum value selector for selecting a minimum value of outputs from said address gate circuits, and a continuous multiplexer for limiting a predetermined number of continuous address positions including the address position from the selected address positions.

19. A digital fuzzy apparatus comprising:

operating circuit for performing an operation on an input signal in accordance with membership functions constituting a fuzzy rule, and outputting output values consisting of an operation value and an address position;

switching circuit for time-serially switching the membership functions in synchronism with clock pulses, said switching circuit being arranged to switch the membership functions so that output values from said operating circuit are time-serially output in an order of address positions; and inference output circuit for storing the time-serial output values from said operating circuit and performing inference on the basis of the output values, said inference output circuit being arranged to select valid operation values of the operation values sequentially output from said, inference output circuit, calculating a center of gravity position of the output values within a limited address positional range on the basis of the address positions corresponding to the selected operation value, and outputting the center of gravity position.

20. An apparatus according to claim 19, wherein the operation value is a value representing a fitness degree for the fuzzy rule at the address position.

21. An apparatus according to claim 19, wherein the operation value is a maximum value of the values representing a fitness degrees for the fuzzy rule.

* * * * *

UNITED STATES PATENT AND TRADEMARK OFFICE
CERTIFICATE OF CORRECTION

PATENT NO. : 5,202,954

DATED : April 13, 1993

INVENTOR(S) : MIYAZAWA, Azuma et al.

It is certified that error appears in the above-identified patent and that said Letters Patent is hereby corrected as shown below:

```
Title page, Section [57] ABSTRACT,
           Lines 13, 14, 18, 19, 20, & 22 change "barycentral" to --center of gravity--
```

Signed and Sealed this

Ninth Day of August, 199

Attest:

BRUCE LEHMAN

*Attesting Officer*      *Commissioner of Patents and Trademarks*